(12) United States Patent  
Fortenberry et al.

(10) Patent No.: US 6,990,519 B2
(45) Date of Patent: Jan. 24, 2006

(54) USE OF A DIRECTED ACYCLIC ORGANIZATION STRUCTURE FOR SELECTION AND EXECUTION OF CONSISTENT SUBSETS OF REWRITE RULES

(75) Inventors: Todd D. Fortenberry, McKinney, TX (US); Floyd R. Gerwig, Plano, TX (US); David Ross Stoutemyer, Kaneohe, HI (US)

(73) Assignee: Texas Instruments Incorporated, Dallas, TX (US)

( * ) Notice: Subject to any disclaimer, the term of this patent is extended or adjusted under 35 U.S.C. 154(b) by 790 days.

(21) Appl. No.: 10/062,598

(22) Filed: Jan. 31, 2002

(65) Prior Publication Data

US 2003/0088533 A1 May 8, 2003

Related U.S. Application Data

(60) Provisional application No. 60/344,603, filed on Nov. 8, 2001.

(51) Int. Cl.
*G06N 5/00* (2006.01)
(52) U.S. Cl. ..................................................... 709/223
(58) Field of Classification Search ................. 706/45, 706/20; 455/313; 382/227; 709/223; 434/350, 434/219, 188; 235/70 R
See application file for complete search history.

(56) References Cited

U.S. PATENT DOCUMENTS

| | | | | |
|---|---|---|---|---|
| 5,731,572 A | * | 3/1998 | Winn | 235/70 R |
| 5,827,066 A | * | 10/1998 | Henter | 434/188 |
| 5,909,646 A | * | 6/1999 | Deville | 455/313 |
| 6,269,353 B1 | * | 7/2001 | Sethi et al. | 706/20 |
| 6,427,063 B1 | * | 7/2002 | Cook et al. | 434/350 |
| 6,532,305 B1 | * | 3/2003 | Hammen | 382/227 |
| 6,755,659 B2 | * | 6/2004 | LoSasso et al. | 434/219 |

* cited by examiner

*Primary Examiner*—Wilbert L. Starks, Jr.
(74) *Attorney, Agent, or Firm*—J. Dennis Moore; W. James Brady, III; Frederick J. Telecky, Jr.

(57) ABSTRACT

The present invention discloses the use of a hand-held calculator programmed to teach subject matter such as mathematics in a manner that emulates traditional step-by-step teacher-student teaching methods and shows the important intermediate steps. The method evaluates a selected problem against a master set of possible operations, organized according to a hierarchy that can be applied to the problem and then provides choices of several operations that are applicable or can operate on a selected problem. Importantly, the choices available to the student will not always lead to a solution or simplification of the problem. This allows the student to see the effect of a good choice, as well as a poor choice. If the problem can be operated on further, the results of the previous operations have a new problem or expression to be solved. This repetitive process continues until there are no further operations possible that will move the problem closer to a final solution.

49 Claims, 33 Drawing Sheets

FIG. 2f

```
┌──────┬──────┬─────┬─────┬─────┬──────────┐
│ F1▼  │ F2▼  │ F3  │ F4  │ F5  │          │
│Prob Set│Prob│[a]+b│Trans│Tools│          │
├──────┴──────┴─────┴─────┴─────┴──────────┤
│ P1: Solve for x                          │
│ ─────────────────────────────────────────│
│ x²−3*x=4                                 │
│ ►add ⁻4 to each side                     │
│ ┌──────────────────┐                     │
│ │x²−3*x+⁻4=4+⁻4    │                     │
│ └──────────────────┘                     │
│ ►simplify                                │
│   Press <ENTER>                          │
│                                          │
│ MAIN      RAD AUTO     FUNC    │ PAUSE   │
└──────────────────────────────────────────┘
```

FIG. 2g

```
┌──────┬──────┬─────┬─────┬─────┬──────────┐
│ F1▼  │ F2▼  │ F3  │ F4  │ F5  │          │
│Prob Set│Prob│[a]+b│Trans│Tools│          │
├──────┴──────┴─────┴─────┴─────┴──────────┤
│ P1: Solve for x                          │
│ ─────────────────────────────────────────│
│ x²−3*x=4                                 │
│ ►add ⁻4 to each side                     │
│ x²−3*x+⁻4=4+⁻4                           │
│ ►simplify                                │
│ ┌──────────────┐                         │
│ │x²−3*x−4=0    │                         │
│ └──────────────┘                         │
│ MAIN      RAD AUTO     FUNC       1/1    │
└──────────────────────────────────────────┘
```

FIG. 2h

```
┌──────────────────────────────────────────┐
│         SELECT TRANSFORMATION            │
│              x²−3*x−4=0                  │
│                                          │
│   1:add ? to each side                   │
│   2:multiply each side by ?              │
│   3:switch sides                         │
│   4:factor left-hand side                │
│   5:quadratic formula                    │
│   6:enter subexpr selection              │
│ MAIN      RAD AUTO     FUNC       1/1    │
└──────────────────────────────────────────┘
```

*FIG. 2i*

```
F1▼    F2▼   F3    F4    F5
Prob Set│Prob│[a]+b│Trans│Tools
P1: Solve for x
─────────────────────────────
$x^2 - 3*x + {}^-4 = 4 + {}^-4$
► simplify
$x^2 - 3*x - 4 = 0$
► factor left-hand side
$(x-4)*(x+1) = 0$

MAIN      RAD AUTO      FUNC   1/1
```

*FIG. 2j*

```
        SELECT TRANSFORMATION
         (x-4)*(x+1)=0
─────────────────────────────────
1: add ? to each side
2: multiply each side by ?
3: switch sides
─────────────────────────────────
4: A*B=0 → A=0 or B=0
5: distribute multiplication
6: (A±B)*C → A*C ± B*C
7↓A*(B±C) → A*B ± A*C
MAIN      RAD AUTO      FUNC   1/1
```

*FIG. 2k*

```
F1▼    F2▼   F3    F4    F5
Prob Set│Prob│[a]+b│Trans│Tools
P1: Solve for x
─────────────────────────────
$x^2 - 3*x - 4 = 0$
► factor left-hand side
$(x-4)*(x+1) = 0$
► A*B=0 → A=0 or B=0
$x-4=0$ or $x+1=0$

MAIN      RAD AUTO      FUNC   1/1
```

FIG. 2l

```
┌─────────────────────────────────────┐
│  ╭──────────────────────────────╮   │
│  │      SELECT TRANSFORMATION   │   │
│  ├──────────────────────────────┤   │
│  │                              │   │
│  │      x-4=0 or x+1=0          │   │
│  │                              │   │
│  ├──────────────────────────────┤   │
│  │  1:solve linear equation     │   │
│  │  2:enter subexpr selection   │   │
│  │                              │   │
│  ╰──────────────────────────────╯   │
│  TYPE OR USE ← → ↑↓ +[ENTER] OR [ESC]│
└─────────────────────────────────────┘
```

FIG. 2m

```
┌──────────────────────────────────────┐
│ F1▼   F2▼  F3    F4    F5            │
│Prob Set│Prob│[a]+b│Trans│Tools        │
├──────────────────────────────────────┤
│ P1: Solve for x                      │
├──────────────────────────────────────┤
│ (x-4)*(x+1)=0                        │
│ ►A*B=0 → A=0 or B=0                  │
│ x-4=0 or x+1=0                       │
│ ►solve linear equation               │
│ ┌──────────────┐                     │
│ │ x=4 or x=⁻1  │                     │
│ └──────────────┘                     │
│                                      │
│ MAIN    RAD AUTO    FUNC    1/1      │
└──────────────────────────────────────┘
```

FIG. 2n

```
┌──────────────────────────────────────┐
│ F1▼   F2▼  F3    F4    F5            │
│Prob Set│Prob│[a]+b│Trans│Tools        │
├──────────────────────────────────────┤
│ P1: Solve for x                      │
├──────────────────────────────────────┤
│ x²-3*x-4=0                           │
│ ► quadratic formula                  │
│                                      │
│       ⁻3+√(⁻3)²-4*1*⁻4               │
│   x= ─────────────────── or ►        │
│            2*1                       │
│                                      │
│ MAIN    RAD AUTO    FUNC    1/1      │
└──────────────────────────────────────┘
```

FIG. 3c

```
| F1▼      | F2▼  | F3    | F4▼   | F5    |
| Prob Set | Prob | ⓐ/b  | Trans | Tools |
```
P3: Solve for x $x^2 - 3*x = 4$
► complete the square ⟵ 64

$\boxed{x^2 - 3*x + \left(\frac{3}{2}\right)^2 = 4 + \left(\frac{3}{2}\right)^2}$ ⟵ 66

MAIN            DEG AUTO         FUNC 3/4

FIG. 3d

```
| F1▽      | F2▽  | F3    | F4▼   | F5    |
| Prob Set | Prob | ⓐ/b  | Trans | Tools |
```
P3: Solve for x $x^2 - 3*x = 4$
► complete the square $\left[x^2 - 3*x + \left(\frac{3}{2}\right)^2\right] = 4 + \left(\frac{3}{2}\right)^2$

68

USE ←, →, ↓, ↑  Shift ←, Shift →, ESC, F3, F4, F7

FIG. 3e

```
| F1▽      | F2▽  | F3    | F4▼   | F5    |
| Prob Set | Prob | ⓐ/b  | Trans | Tools |
```
P3: Solve for x | 1: $A^2 \pm 2AB + B^2 \rightarrow (A \pm B)^2$ $x^2 - 3*x = 4$ | 2: factor
► complete the squar | 3: simplify
                     | 4: arithmetic
$x^2 - 3*x + \left(\frac{3}{2}\right)^2 = 4 + \left(\frac{5: (A/B)^\wedge C \rightarrow A^\wedge C / B^\wedge C}{2}\right)$

TYPE OR USE ← → ↑ ↓ +[ENTER]=OK AND [ESC]=CANCEL

*FIG. 3f*

```
┌F1▼──┬F2▼─┬F3──┬F4▼──┬F5───┐
│Prob Set│Prob│ⓐ/b │Trans│Tools│
├────┴────┴────┴────┴────┤
│P3: Solve for x         │
├────────────────────────┤
│►complete the square    │
│ ┌─────────────────────┐│
│ │x²−3*x+(3/2)² =4+(3/2)²││
│ └─────────────────────┘│
│►A²±2AB+B² → (A±B)²     │
│ ┌─────────────────────┐│
│ │(x−3/2)² =4+(3/2)²   ││
│ └─────────────────────┘│
│MAIN      DEG AUTO   FUNC 3/4│
└────────────────────────┘
```

*FIG. 3g*

```
┌F1▽──┬F2▽─┬F3──┬F4▼──┬F5───┐
│Prob Set│Prob│ⓐ/b │Trans│Tools│
├────┴────┴────┴────┴────┤
│P3: Solve for x         │
├────────────────────────┤
│►complete the square    │
│ x²−3*x+(3/2)² =4+(3/2)²│
│►A²±2AB+B² → (A±B)²     │
│ (x−3/2)² = ┆4+(3/2)²┆  │
│MAIN      DEG AUTO   FUNC 3/4│
└────────────────────────┘
```

*FIG. 3h*

```
┌F1▽──┬F2▽─┬F3──┬F4▼──┬F5───┐
│Prob Set│Prob│ⓐ/b │Trans│Tools│
├────────┬───────────────┤
│P3: Solve for x│1:A+B=B+A│
│►complete the squar│2:factor│
│                │3:simplify│
│ x²−3*x+(3/2)²=4+(│4:order terms│
│                │5:arithmetic│
│►A²±2AB+B² → (A±│6: (A/B)^C → A^C/B^C│
│ (x−3/2)² = ┆4+(3/2)²┆  │
│MAIN      DEG AUTO   FUNC 3/4│
└────────────────────────┘
```

FIG. 3i

```
F1▼    F2▼   F3    F4▼   F5
Prob Set Prob ⓐ/b Trans Tools
```
P3: Solve for x ▶ $A^2 \pm 2AB + B^2 \rightarrow (A \pm B)^2$ $\left(x - \frac{3}{2}\right)^2 = \boxed{4 + \left(\frac{3}{2}\right)^2}$ ▶ arithmetic $\boxed{\left(x - \frac{3}{2}\right)^2 = \frac{25}{4}}$

MAIN           DEG AUTO         FUNC 3/4

FIG. 3j

```
F1▼    F2▼   F3    F4▼   F5
Prob Set Prob ⓐ/b Trans Tools
```
P3: Solve for x | 1:add ? to each side
▶ $A^2 \pm 2AB + B^2$ | 2:subtract ? from each side
| 3:multiply each side by ?
$\left(x - \frac{3}{2}\right)^2 = 4 + \left(\frac{3}{2}\right)$ | 4:divide each side by ?
| 5:switch sides
| 6:$A^2 = B \rightarrow A = \sqrt{B}$ or $A = -\sqrt{B}$
▶ arithmetic | 7:expand
$\left(x - \frac{3}{2}\right)^2 = \frac{25}{4}$ | 8:$(A \pm B)^2 \rightarrow A^2 \pm 2AB + B^2$

MAIN           DEG AUTO         FUNC 3/4

FIG. 3k

```
F1▼    F2▼   F3    F4▼   F5
Prob Set Prob ⓐ/b Trans Tools
```
P3: Solve for x ▶ arithmetic $\left(x - \frac{3}{2}\right)^2 = \frac{25}{4}$ ▶ $A^2 = B \rightarrow A = \sqrt{B}$ or $A = -\sqrt{B}$ $\boxed{x - \frac{3}{2} = \sqrt{\frac{25}{4}} \text{ or } x - \frac{3}{2} = -\sqrt{\frac{25}{4}}}$

MAIN           DEG AUTO         FUNC 3/4

*FIG. 3l*

| F1▼ | F2▼ | F3 | F4▼ | F5 |
|---|---|---|---|---|
| Prob Set | Prob | ⓐ/b | Trans | Tools |

P3: Solve for x

▶ arithmetic $\left(x-\dfrac{3}{2}\right)^2 = \dfrac{25}{4}$

▶ A^2=B → A=√B    1: solve linear equation
2: √(A) → A^(1/2)
3: distribute √
4: √(A/B) → √(A)/√(B)
5: √(A/B) → √(|A|)/√(|B|)
6: evaluate √

$x-\dfrac{3}{2} = \sqrt{\dfrac{25}{4}} \text{ or } x-\dfrac{3}{2} = -\sqrt{\dfrac{25}{4}}$

MAIN        DEG AUTO        FUNC 3/4

*FIG. 3m*

| F1▼ | F2▼ | F3 | F4▼ | F5 |
|---|---|---|---|---|
| Prob Set | Prob | ⓐ/b | Trans | Tools |

P3: Solve for x

▶ A^2=B → A=√B or A=-√B $x-\dfrac{3}{2} = \sqrt{\dfrac{25}{4}} \text{ or } x-\dfrac{3}{2} = -\sqrt{\dfrac{25}{4}}$ ▶ evaluate √

$x-\dfrac{3}{2} = \dfrac{5}{2} \text{ or } x-\dfrac{3}{2} = -\dfrac{5}{2}$

MAIN        DEG AUTO        FUNC 3/4

*FIG. 3n*

| F1▼ | F2▼ | F3 | F4▼ | F5 |
|---|---|---|---|---|
| Prob Set | Prob | ⓐ/b | Trans | Tools |

P3: Solve for x    1: solve linear equation

▶ A^2=B → A=√B or A=-√B $x-\dfrac{3}{2} = \sqrt{\dfrac{25}{4}} \text{ or } x-\dfrac{3}{2} = -\sqrt{\dfrac{25}{4}}$ ▶ evaluate √

$x-\dfrac{3}{2} = \dfrac{5}{2} \text{ or } x-\dfrac{3}{2} = -\dfrac{5}{2}$

TYPE OR USE ←→↑↓+[ENTER]=OK AND [ESC]=CANCEL

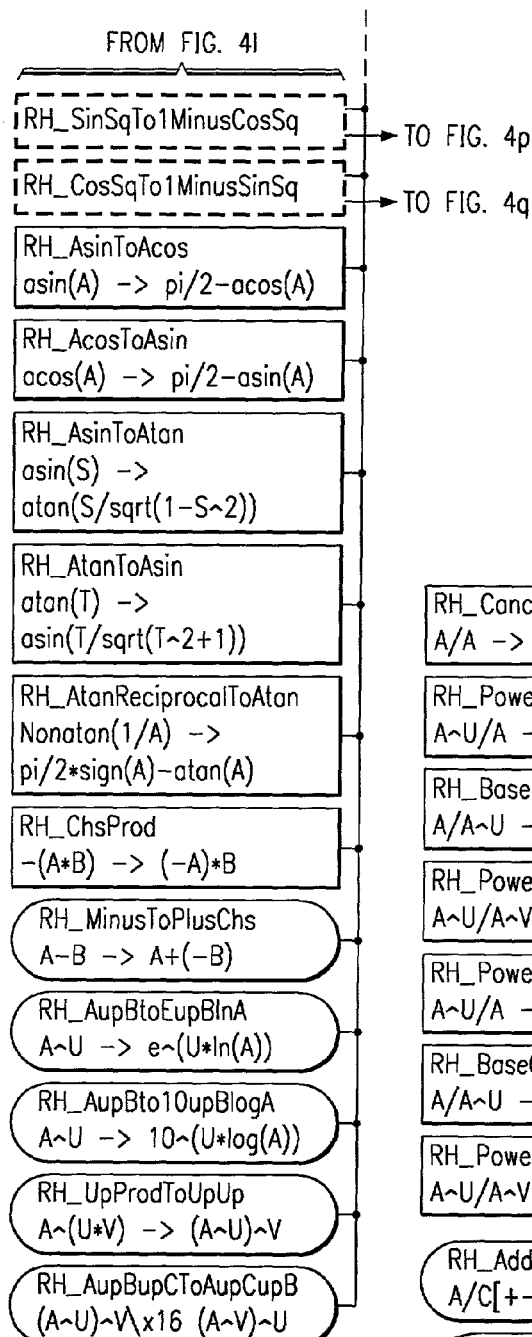
FIG. 4*l*
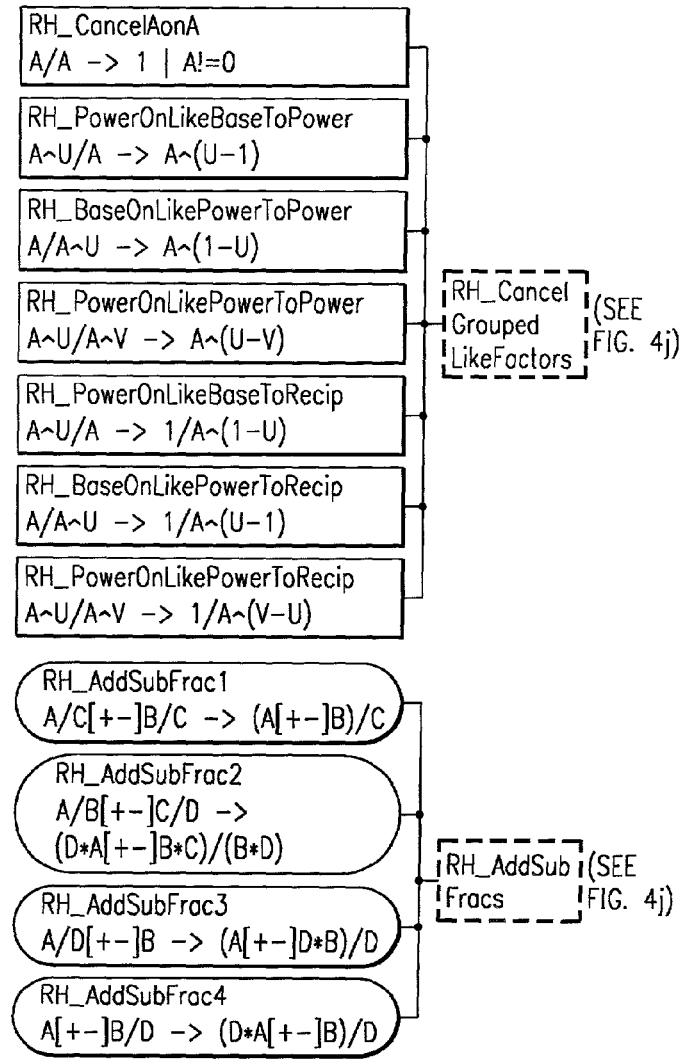
FIG. 4*m*

FROM FIG. 4s

USE OF A DIRECTED ACYCLIC ORGANIZATION STRUCTURE FOR SELECTION AND EXECUTION OF CONSISTENT SUBSETS OF REWRITE RULES

This application claims priority from the provisional application No. 60/344,603 filed Nov. 8, 2001 and having the same title.

This application is related to the Texas Instruments Application having number TI-32321 filed Nov. 8, 2001 and having at least one common inventor, and also Texas Instruments Application TI-32537 filed on Aug. 24, 2001 and having Ser. No. 09/939,128.

FIELD OF THE INVENTION

This invention relates to software or firmware to aid in teaching various subjects including mathematics with the help of electronic calculators. More particularly, the invention relates to programmable calculators used to teach mathematics and other subject matter where the solution to a problem is achieved by selection and application of subsets of actions from a set of actions. As will be appreciated by those skilled in the art, the teaching of mathematics is particularly suited to such teaching methods. Even more specifically suited are those areas of mathematics involving a CAS (Computer Algebra System) designed for enhancing the teaching of mathematics by using a basic data structure that emulates the way mathematics is traditionally taught. Another important feature offered by calculators is the easy transfer or sharing of problem data with other students using similar calculators.

BACKGROUND OF THE INVENTION

Electronic calculators have become a common tool for students taking courses at all levels of mathematics. More recently, some of the more sophisticated calculators have also emerged as learning tools. In particular, the features of graphing calculators have resulted in their use in the classroom as they provide significant advantages to the student in the learning process. Graphing calculators, as an example, are characterized by a large screen, which permits the display of mathematical expressions in traditional format, such as with raised exponents and built-up fractions, and also allows multi-lines of information. Here and throughout, the word "expression" is often used to denote equations and inequalities as well as formulas that do not contain an equality or inequality operator.

These graphing calculators also permit displays of graphs, tables and programs. Preferred graphing calculators also permit data transmission to other computing devices, directly or by means of a data storage medium as well as data collection by means of various interface protocols. Many calculator models are designed for particular education levels. However, regardless of the level for which a calculator is designed, a usual goal is to provide a logical and easy to use interface with the student. Two commercially available calculators that are particularly suitable as teaching tools are the Texas Instruments "TI-89" and "TI- 92 Plus" Graphing Calculators available from Texas Instruments Incorporated of Dallas, Tex.

Mathematics is particularly suited to obtaining solutions to problems by correctly selecting a proper transformation or operation rule and then applying the selected rule to the problem. More specifically, this process represents a programming paradigm often classified as "rewrite rules." Further, in a more general sense, rewrite rules may also be applied to other uses such as optimizing compilers, parsing natural and computer languages, database queries, theorem proving, and especially computer CAS (Computer Algebra Systems). This paradigm is also called term rewriting, or rule-based programming and is related to equational logic and constraint-based programming. Most of the literature on this subject may be found in the references titled, "Proceedings $n^{th}$ Rewriting Techniques and Applications," for n=1, 2, etc., published by Springer-Verlag.

Although as discussed above, even though "rewrite rule" paradigms have other applications, they are particularly applicable to mathematics. Consequently, the discussions herein are made with respect to mathematics and more specifically with respect to areas of mathematics for which CAS (Computer Algebra Systems) have been developed and used with computers and calculators.

An example of a "rewrite rule" or transformation that may be applied to trigonometry is:

For all A, $\sin(A)/\cos(A) \rightarrow \tan(A)$

As an example of its use, this rule could transform $5+\sin(3x)/\cos(3x)+\sin(y^2)/\cos(y^2)$ to $5+\tan(3x)+\tan(y^2)$.

As is clear, in this example A matches 3x in the second term, whereas A matches $y^2$ in the third term.

To help avoid confusion with respect to the above example as well as other examples used herein, capital letters will be used to represent "pattern variables" (e.g. A), and lower case letters will be used to represent the user variables (e.g. x and y).

Furthermore, some rewrite rules might have certain conditions that the match must satisfy for the replacement to occur. For example, for a rule related to differentiation, the rule might be:

For all A, U and variables X such that A is free of X,
$d/dX(A \cdot U) \rightarrow A \, d/dX(U)$.

Furthermore, there are often several alternatives for applying an applicable rule. For example, one extreme is to apply a rule only once and only if the pattern matches the entire expression. The other extreme is to apply the rule repeatedly wherever it is applicable throughout the expression until the expression is idem potent, which means the rule is no longer applicable anywhere in the expression.

Most CAS (Computer Algebra Systems) are intended for mathematically experienced users. Therefore, such systems typically manipulate large mathematical expressions and produce simplified final answers without showing any of the intermediate steps. These types of computer algebra systems may provide rewrite rules as a convenient way for users to extend the built-in mathematical capabilities of their computer or calculator. For example, a user can use these capabilities to implement Bessel functions together with their derivatives, integrals and recurrence relations if these mathematical capabilities are not already built-in or available as an add-on package. However, the built-in mathematical capabilities are typically implemented entirely, or at least substantially by using functional and/or procedural paradigms, which execute fast and are more suitable for highly synthetic algorithms such as modern polynomial factoring algorithms. These type algorithms do nothing to aid a student in learning the process and are typically most appropriate for mathematically experienced users.

In contrast, and according to the present invention, a CAS is intended to help a student learn subjects such as algebra, pre-calculus, calculus, or any other area of mathematics and is based on a different set of targets or goals. For example, a CAS used for teaching should allow the user to highlight the expression that is to be transformed so that students can easily revise an earlier step. Furthermore, some mathematical expressions are extremely complex and are simplified by transforming only certain sub-expressions. Therefore the system should also allow the user to highlight sub-expressions that are only part of an entire expression. Thus, at each step, the student may control exactly where transformations or operations are carried out. It should be noted that both the terms "transformation" and "operation" are used herein and are substantially synonymous. However, transformation is somewhat more appropriate for the context of rewrite rules, and consequently may be used herein to describe any operation including non-mathematical operations. The desired system could also automatically choose the sub-expression and transformation for the next step or alternately do this for all of the successive steps in a derivation without user intervention. These goals encourage the use of rewrite rules to implement almost all the transformations for such educational computer algebra systems. This is because rewrite rules: (a) most clearly reflect the way students are taught to do derivations; (b) such rules are inherently modular and facilitate the selection of various subsets of transformations that can be applied to each step of the derivation; and (c) separating the transformations into left side patterns and right side replacements facilitates building a context-sensitive menu of applicable rules that can then be presented to the user.

As will be appreciated by those skilled in the art, there are several hundred rules that are applicable to the teaching of algebra through calculus. Unfortunately, because of the wide range of skills and applicability, use of the rules often entails several difficulties. For example, dozens of transformations are often applicable to an expression. Unfortunately, menus offering more than just a few choices may be extremely intimidating, difficult, and even worthless to students who are just learning the techniques that are addressed or selectable from the various menu items. In addition, many of the rules will reverse the operation of previous applied rules, and therefore, can lead to an infinite loop if both of the rules are repeatedly and alternately applied. For example, consider the rules $$A^{-N} \to \frac{1}{A^N} \text{ and } \frac{B}{A^N} \to B \cdot A^{-N}.$$

Both of these transformations are applicable to the expression $$x^{-2} + \frac{3}{x^5}.$$

However, as one skilled in the art will quickly understand, if both of these rules are applied until neither is applicable, they keep reversing each other until the replacements are aborted either by exhaustion of memory or by a keyboard interrupt from the user.

Still another difficulty arises from the fact that it is sometimes desirable to employ one set of rules to trigger a particular transformation, but employ a different set of rules to further transform a new sub-expression generated by the triggering transformations. For example, considering the rule $A^N \cdot A^M \to A^{N+M}$ for collecting like factors. Acting alone, this rule would transform $x^2 \cdot x^3 + 6 + 1$ to $x^{2+3} + 6 + 1$, which would be very helpful to weak students or students who are just learning how to use this collection rule. However, for more advanced students it is desirable to have a transformation "combine like factors" that would instead transform the expression to $x^5 + 6 + 1$ by also doing the arithmetic in the exponent generated by collecting like factors. However, even when "combine like factors" is used, gratuitous arithmetic is not also automatically outside the newly generated exponent. For example, the 6+1 is not automatically added together to yield 7 in the above example.

Thus, it should be recognized that as students start learning a particular subject or set of rules with respect to mathematics, it is appropriate that very small or fine steps be used as they learn to do typical algebraic simplifications. However, coarser or more involved automatic algebraic simplifications are appropriate to the student who already knows the rules of algebraic simplification quite well and is trying to learn how to solve a linear equation. Similarly, as a student's ability increases, coarser steps for solving a linear equation would better serve the student when learning how to solve a quadratic equation. Likewise, coarser algebraic simplification steps for solving quadratic equations should be used when the student is learning differentiation and/or symbolic integration. Therefore, it should be clear that the most appropriate menu items do not depend only upon the users expression that is to be transformed, but also the problem area and the skill of the student learning from the process.

Another difficulty is that the usual practice of applying rewrite rules may employ a very inefficient algorithm that can be intolerably slow for large problems.

Prior Art

MathPert™ is a program available from Mathpert Systems, 2211 Lawson Lane, Santa Clara Calif. 95054. The principal program author M. Beeson describes the implementation in an article titled "Design Principles of MathPert™", published in the conference proceedings "Computer-Human Interaction and Symbolic Computation", (editor N. Kajler, Springer-Verlag, ISBN 3-211-82843-5, pages 89–115). The article includes a brief reference to rewrite rules, but the article strongly suggests that they are not being used in the manner of the present invention.

The HP-40G, HP-48G, and Casio FX 2.0 hand-held calculators have some very limited computer algebra that allows students to choose or show only large steps such as "factor", "expand", or "common denominator". Consequently, there are so few different possible transformations that there is little need to build a context-dependent menu or provide for subsets of more than one transformation.

SUMMARY OF THE INVENTION

The present invention seeks to help students of mathematics learn the symbolic aspects of algebra and calculus by helping them to use definitions and theorems to solve calculation problems based on such symbolic aspects, and to obtain textbook-like solutions. The invention helps students recognize the possible transformations that can be applied to a problem and helps students anticipate the results of applying alternative transformations.

Embodiments of the present invention are described herein with respect to a graphing calculator that allows the user to step through the solution of a mathematical problem. The user interface of the calculator helps the student to more readily learn how to solve problems and to understand the corresponding mathematical theory.

More specifically, the present invention discloses methods for organizing "actions" and sub-sets of actions applicable to a problem in a way that clarifies procedures for solving the problem. The methods of this invention are particularly suitable for solving mathematical problems such as, for example, simplifying algebraic expressions, solving equations and inequalities, or computing derivatives, integrals and limits.

The method for organizing mathematical operation and/or transformation rules according to the teachings of this invention is to collect pedagogically related rules into hierarchical sets with nodes that are labeled as "menuable" or not to preclude simultaneous selection of contradictory rules that would cause an infinite loop from being activated by a single menu choice. Each hierarchy can be regarded as a tree data structure with rule nodes as the leaves and set nodes as their "parents", "grandparents" etc. However, to save memory space, some of the trees actually share some rule nodes and/or set nodes below the root nodes. Thus, the data structure is actually in the form of a "Directed Acyclic Graph" or DAG, which can be regarded as a set of nodes variously connected by arrows, wherein no path along the direction of successive arrows forms a cycle. Thus, the data structure is acyclic.

Depending upon the problem category, an appropriate node in this DAG is provided to an applicability algorithm that determines which of that node's descendants are applicable to the selected expression or sub-expression, and hence whether or not that node is applicable.

In one embodiment, the system of this invention also includes a pruning algorithm that is used to limit the number of menu items to a manageable level without precluding any of the applicable transformations. A limited number of menu items will then be displayed on the calculator or computer screen for the user to then choose an appropriate item. The pruning is done by omitting some descendants that are also covered by their mutual ancestors.

After the user selects one of the menu items, hence also the corresponding node, a table of pointers directly to the rule node that is that node or to the rule-node descendants of that set node is constructed. This table is sorted by the top-most operator or function in the left-side pattern, then null pointers are inserted to delimit the resulting "buckets" that all have the same top-level operator or function. Next, an auxiliary index table is constructed, with each entry being a pair consisting of an operator followed by a pointer to the beginning of the corresponding bucket. The purpose of the buckets and auxiliary index table is to speed up the process of applying the selected set of transformations to the selected expression or sub-expression. This bucket-building algorithm is optional, as the transformation algorithm could work directly from the selected portion of the DAG.

The transformation algorithm then applies this indexed set of "triggering" rule buckets to the selected expression or sub-expression in a way that is more efficient than the traditional algorithm. Moreover, to allow the automatic application of a different set of rules to the new sub-expressions thus created, the transformation algorithm also accepts a pointer to an indexed set of "follow-up" rule buckets. As discussed above, this enables, for example, "combine like factors" to transform. $x^2 \cdot x^3 + 6 + 1$ all the way to $x^5 + 6 + 1$ by applying the triggering rule $A^N \cdot A^M \rightarrow A^{N+M}$, then applying follow-up arithmetic only to the newly generated exponent 2+3.

Follow-up indexed buckets for situations such as "combine like factors" can optionally be pre-computed at compile time or during program initialization for extra speed.

For many sets of transformations, applying one of them generates opportunities for others in the set. For example, with $1^x \cdot y$ and the set "apply 1 identities", the rule $1^A \rightarrow 1$ produces $1 \cdot y$, which provides an opportunity for the rule $1 \cdot A \rightarrow A$. Therefore, the triggering and follow-up indexed buckets are often the same. Alternately, the follow-up indexed buckets can be empty when no follow-up transformations are desired after the triggering transformations are performed.

A computing device used for this invention to solve mathematical problems will typically include a general-purpose central processing unit that can be programmed to perform the above algorithms, and of course, basic mathematics. The computing device will also include one or more areas or types of memory sufficient to store the program and its static data (such as the DAG) and dynamic data (such as problem sets, solution steps, and indexed buckets). The central processing units and amount of various types of memory in most graphing calculators are sufficient for this.

It should be noted that the applicable transformations might include some that do not advance the problem toward a solution. Thus, according to such examples, the mathematics student is allowed to fail to solve a problem if he selects such a transformation to be applied and doesn't subsequently cancel that step or take additional steps that reverse the misstep.

A typical computational device, such as for example a hand-held calculator will also preferably include a display for displaying multi-lines of information related to the selected mathematical problem and/or sub-expressions making up the problem. The multi-lines of display may display the actual problem steps (expressions) in traditional format as well as represent them internally as a temporary linked list.

The display of the computing device used for this invention allows for display of algebraic expressions in a traditional form along with a graphical way of indicating which sub-expression has been selected, if any.

A keyboard is also typically used for entering the problem or information related to the problems and for selecting a mathematical transformation to be performed on the selected problem. From the above discussion, it will be appreciated that the selected transformation is selected from a temporary list determined by the applicability algorithm.

When the computer and the method of this invention are used for teaching mathematics, the student or user will first enter or select a problem to be solved. Upon entering or selecting a mathematical problem to be solved, then requesting the menu of applicable transformations, the computer will use the DAG to generate a temporary list that will include the applicable mathematical operations that can be applied and used to operate on the selected mathematical problem. As stated above, this list may also include operations that will operate on or transform the format of the selected problem, but do not lead toward a final solution. This list is then displayed on the display screen in a manner that allows the user to select one choice. The student will then choose by any suitable method known in the art, such as for example, highlighting or use of a graphical pointer, etc., which of the displayed mathematical operations will be applied to the problem. The student may, as an example, isolate a mathematical sub-expression contained in the problem for solution or transformation before requesting the list of applicable transformations. Upon selection of the operation to be applied, the computational device will then operate on the selected mathematical problem (expression) with the selected operation. The computer will then display the result generated by applying the mathematical operation to the problem or expression such that the student can see the effect of the operation. If the selected problem is simple enough, a single step of selecting a proper mathematical operation applied to the problem will result in a final solution. However, typically the first operation will simply move the problem toward a solution. Therefore, the mathematical expression resulting from application of a mathematical operation can then be evaluated to determine whether useful transformations are applicable to the result of the previous transformation. If so, the process repeats itself and another list of applicable operations or rules can be presented or displayed for the student to again select an operation (or transformation) for application to the problem. Upon again choosing one of the possible mathematical operations, the computer will again apply the mathematical operation to the "existing" problem (the previously obtained or generated results) and come up with a subsequent result, which presumably will have moved the problem even closer to a final answer. Again, it is important to note that during any of the cycles the student may make an unwise choice and not move the problem closer to a final solution. This process will typically continue until there are no longer any operations that can be applied to further solve or simplify the problem.

BRIEF DESCRIPTION OF THE DRAWINGS

The above features as well as other features of the present invention will be more clearly understood from the consideration of the following description in connection with the accompanying drawings in which.

DESCRIPTION OF PREFERRED EMBODIMENTS

Figure 1A:
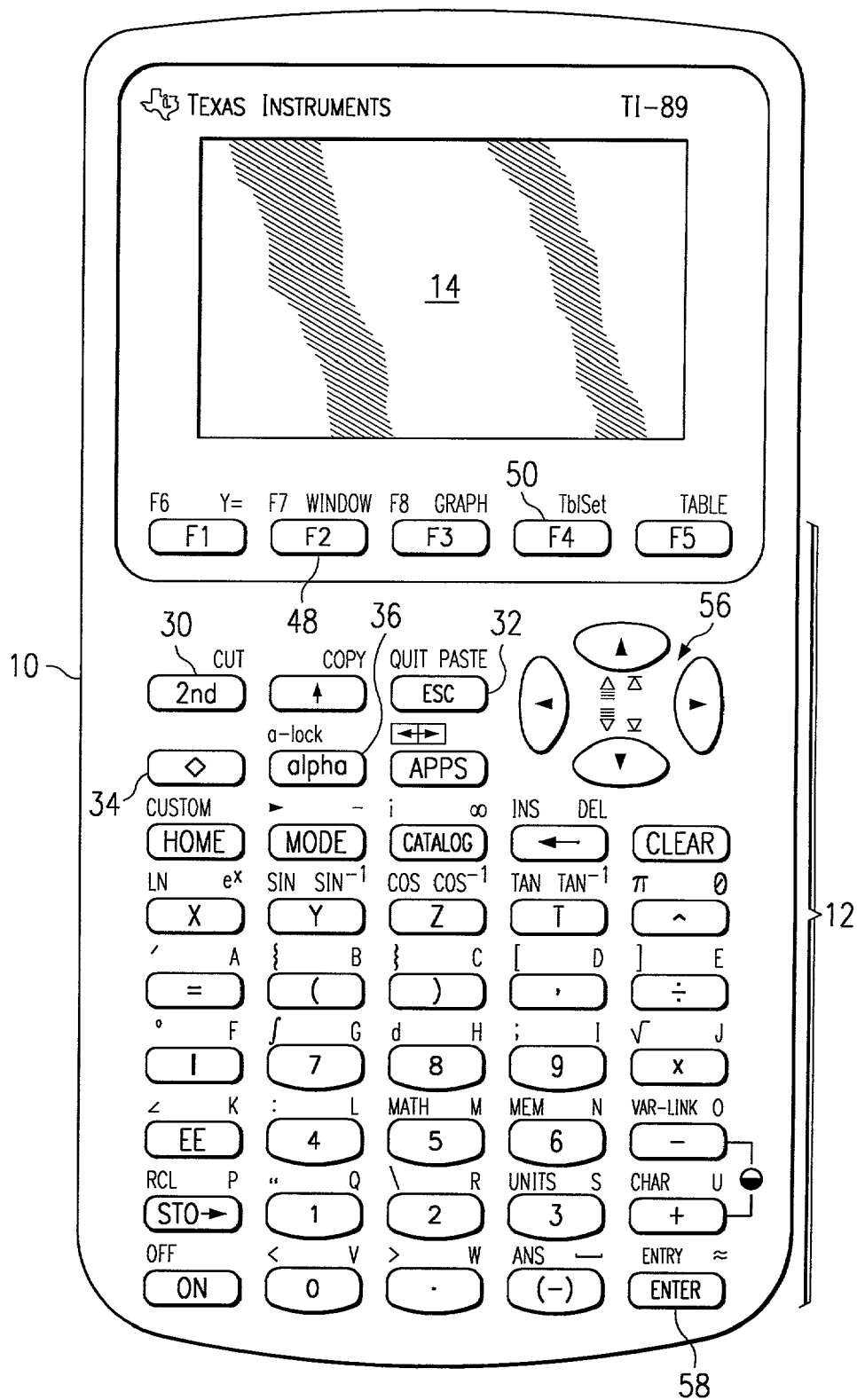
FIG. 1a illustrates the front panel of a calculator suitable for use with the invention.

FIG. 1a illustrates a calculator 10 programmed with the features of the present invention and having a keyboard or front panel 12. Calculator 10 is described herein in terms of particular software and features of the commercially available TI-89 Graphing Calculator manufactured by Texas Instruments Incorporated. Apart from the features of the present invention as they relate to the TI-89 calculator 10, many of the features of calculator 10 described herein are typical of graphing calculators, while other features are unique to the "TI-89" and "TI-92 Plus" family of TI calculators. The use of the TI-89 calculator 10 is for purposes of description, and is not intended to limit the invention, as the features that are the subject of the present invention may be incorporated into other calculators having graphical displays.

The screen 14 shown in FIG. 1a of calculator 10 may be used to provide a "graphical display." However, in addition to the ability to draw graphical displays of various types, the screen 14 may also be used to display multi-lines of data, each data line of which for purposes of this invention may preferably display an expression in traditional format as a problem is solved. Other typical features of a graphing calculator 10 include programming by users, add-on software/firmware applications, together with loading and storage of such programs and applications. The calculator also permits data collection, displays, and analysis. As shown in FIG. 1, a typical screen 14 may include on the order of 100 by 160 pixels. Keypad 12 has various keys for data and command entries used to control the calculator when used to implement the invention as described herein.

Figure 1B:
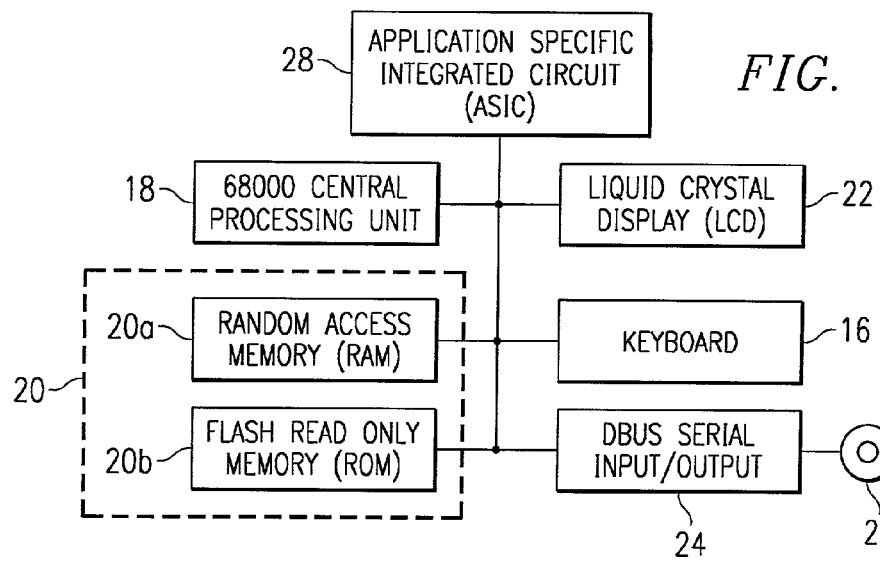
FIG. 1b shows a block diagram of the circuitry of the calculator of FIG. 1a suitable for programming with the features of this invention.

Also as shown in FIG. 1b the calculator includes a keyboard 16, processor 18 connected to a memory unit 20, such as for example, a RAM 20a having over 250K bytes and a ROM 20b having over 700K bytes. Other circuits include a display and its driver 22 such as an LCD (Liquid Crystal Display) and its driver circuit, an input/output data bus 24 and an input/output port 26 for data linking with a unit-to-unit link cable connection capability. Finally, there will also typically be included an ASIC 28 which contains all of its interface logic that allows the different components to communicate with each other. ASIC 28 may also include specialized registers for system control.

As is typical of many calculators, calculator 10 may include a secondary function key shown as the $[2^{nd}]$ key 30, which permits selected keys to have at least two functions. For example, if the [ESC/QUIT/PASTE] key 32 alone is pressed, the calculator performs the ESC function. However, if the $[2^{nd}]$ key 30 is first pressed then followed by the [ESC/QUIT/PASTE] key 32, the calculator will perform the QUIT function. It is also noted that in the embodiment shown in FIG. 1a, key 32 may act as the "paste" key when used in conjunction with the [♦] key 34. For simplicity of explanation herein, a key having two or more functions is referred to in terms of the function appropriate for the context. That is, when discussing the QUIT function, the [ESC/QUIT/PASTE] key 30 is referred to as the [QUIT] key. Similarly, calculator 10 also has an [alpha] key 36 that when pressed makes the next key subsequently pressed input an alphabetic character.

Figure 2A:
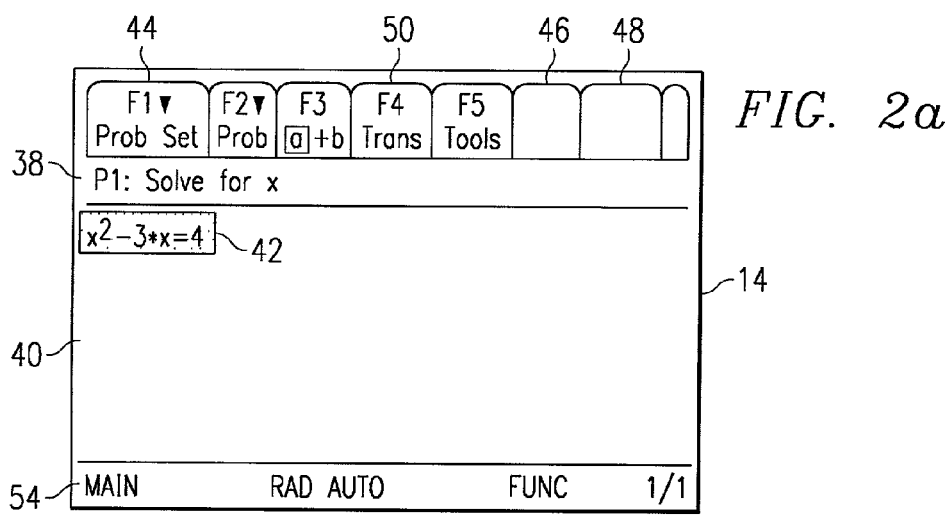
FIGS. 2a–2o illustrate examples of screen displays of a TI-89 calculator while solving a quadratic equation according to a one particular sequence of steps using the features of the present invention.
Figure 2B:
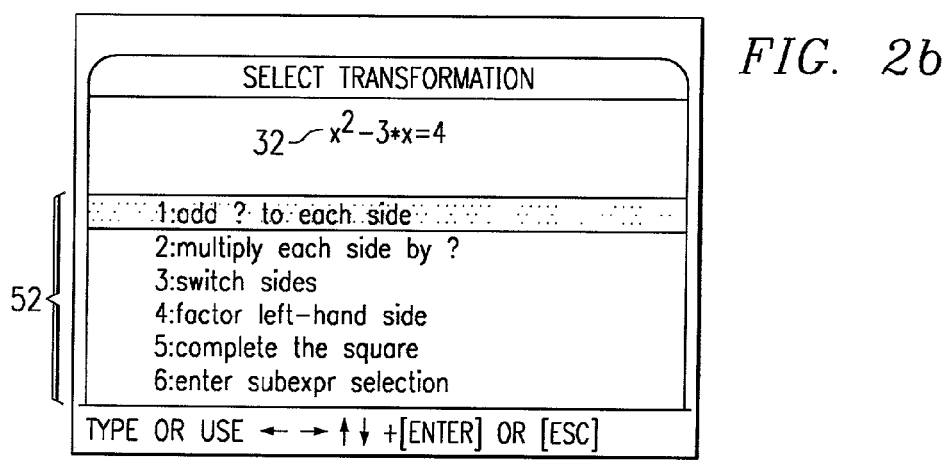
Figure 2C:
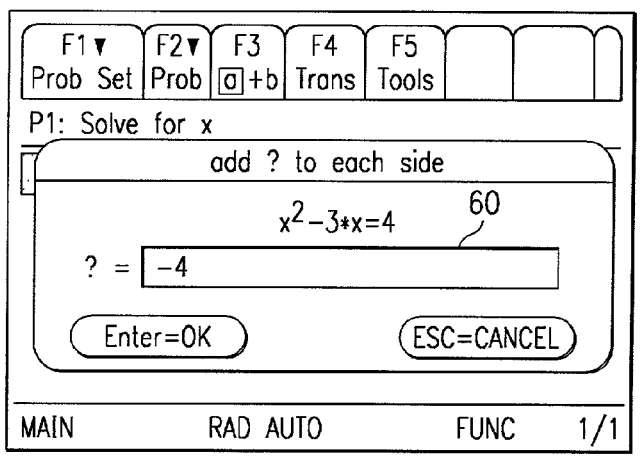
Figure 2D:
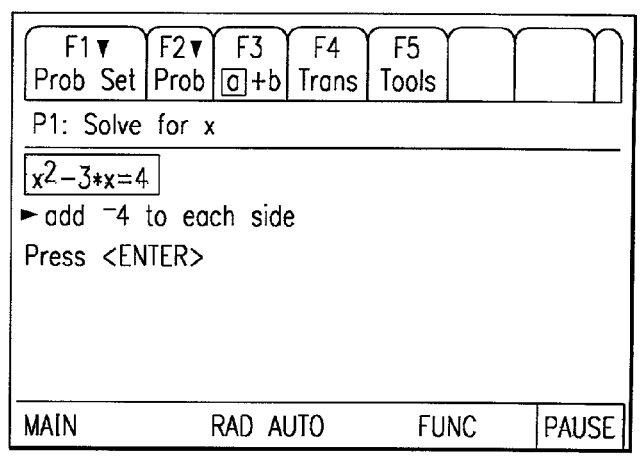

One embodiment of a set of rules organized in a "Directed Acyclic Graph" or DAG is an add-on application developed by Texas Instruments for use with the TI-89 and TI-92+ calculators, and is commercially available as a software product called "Symbolic Math Guide"™ (SMG). FIGS. 2a through 2*o*, to be discussed hereinafter, show a series of screen captures that illustrate the use of SMG to solve a quadratic equation by transforming the equation so that the right side is zero and then factoring. Of course, as is recognized by those skilled in the art, there may be more than one approach that will solve a quadratic equation or other problem. Therefore another series of screen captures (FIGS. 3*a* through 3*o*), also to be discussed below, illustrate the use of "completing the square" to solve the very same quadratic equation and still arrive at the same final answer.

SMG is intended to help students learn real-domain algebra through beginning calculus by helping students develop derivations step by step. However, as mentioned above, the same technique is applicable to other platforms such as computers, and to other areas of mathematics, or for that matter, to any subject matter that can be characterized as selection and application of subsets of actions from a set of actions.

Figure 4A:
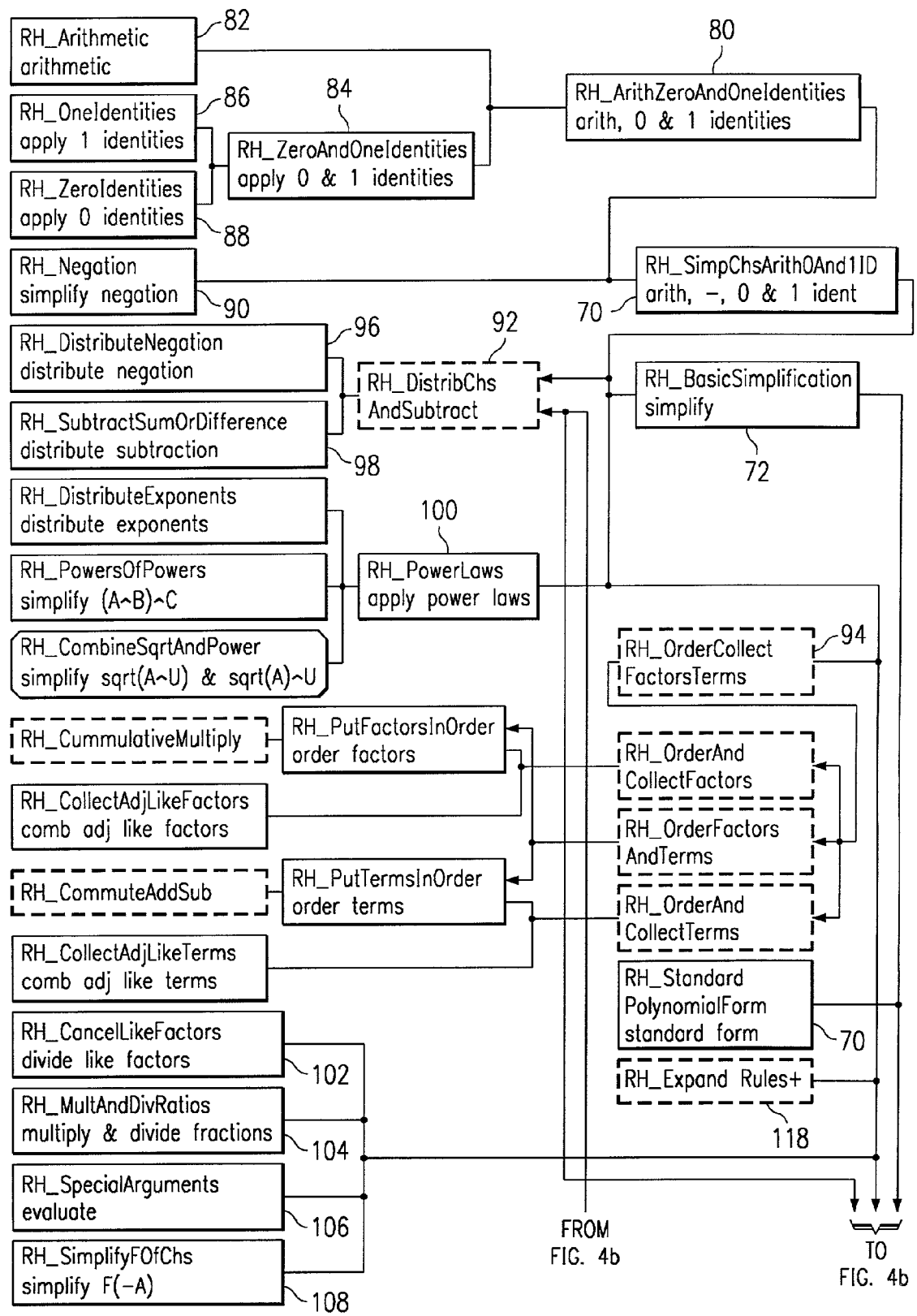
FIGS. 4a through 4t represent a portion of the SMG (Symbolic Math Guide™) embodiment of the Directed Acyclic Graph (DAG) that includes features of the present invention.
Figure 4B:
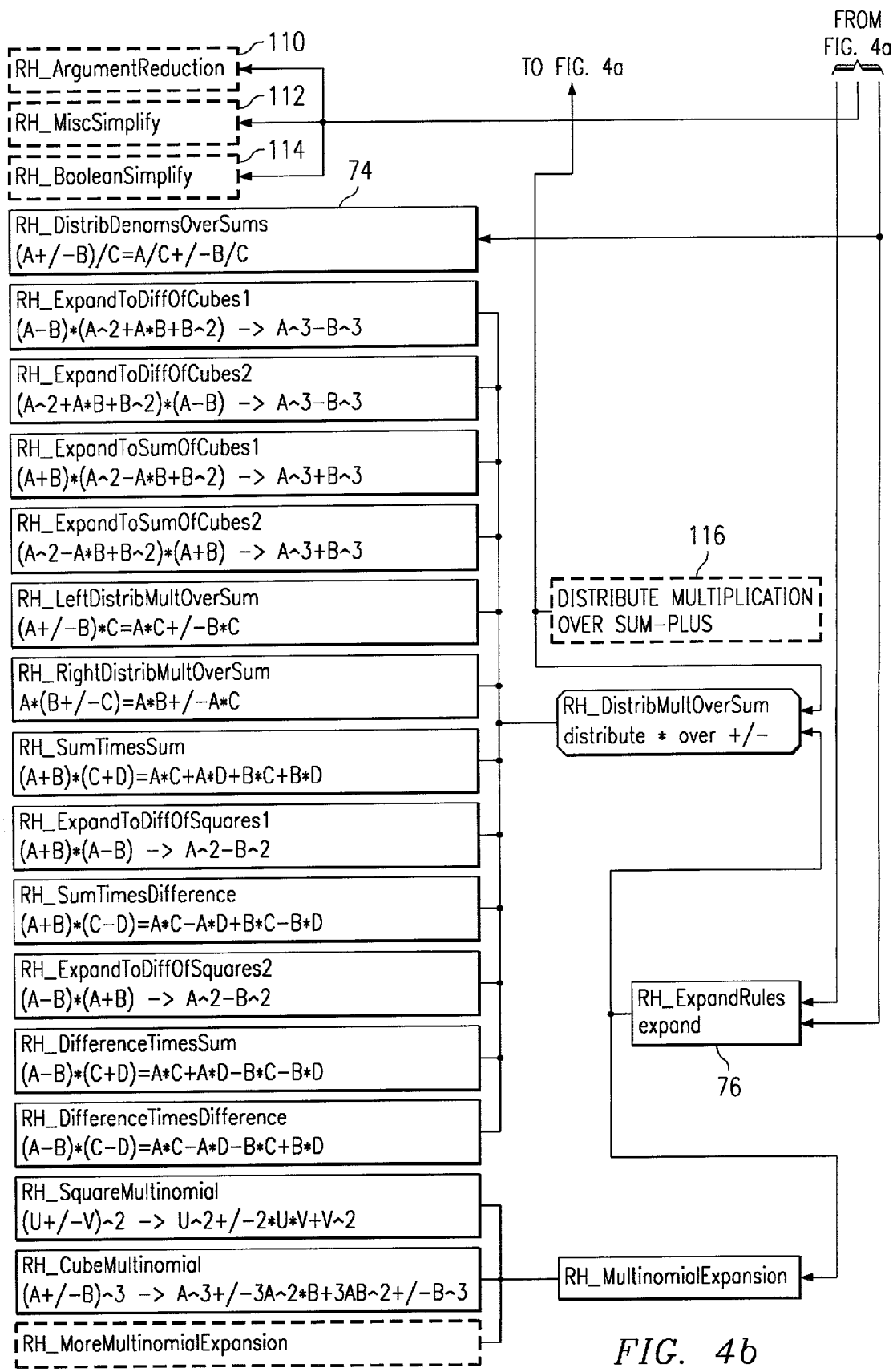
Figure 4C:
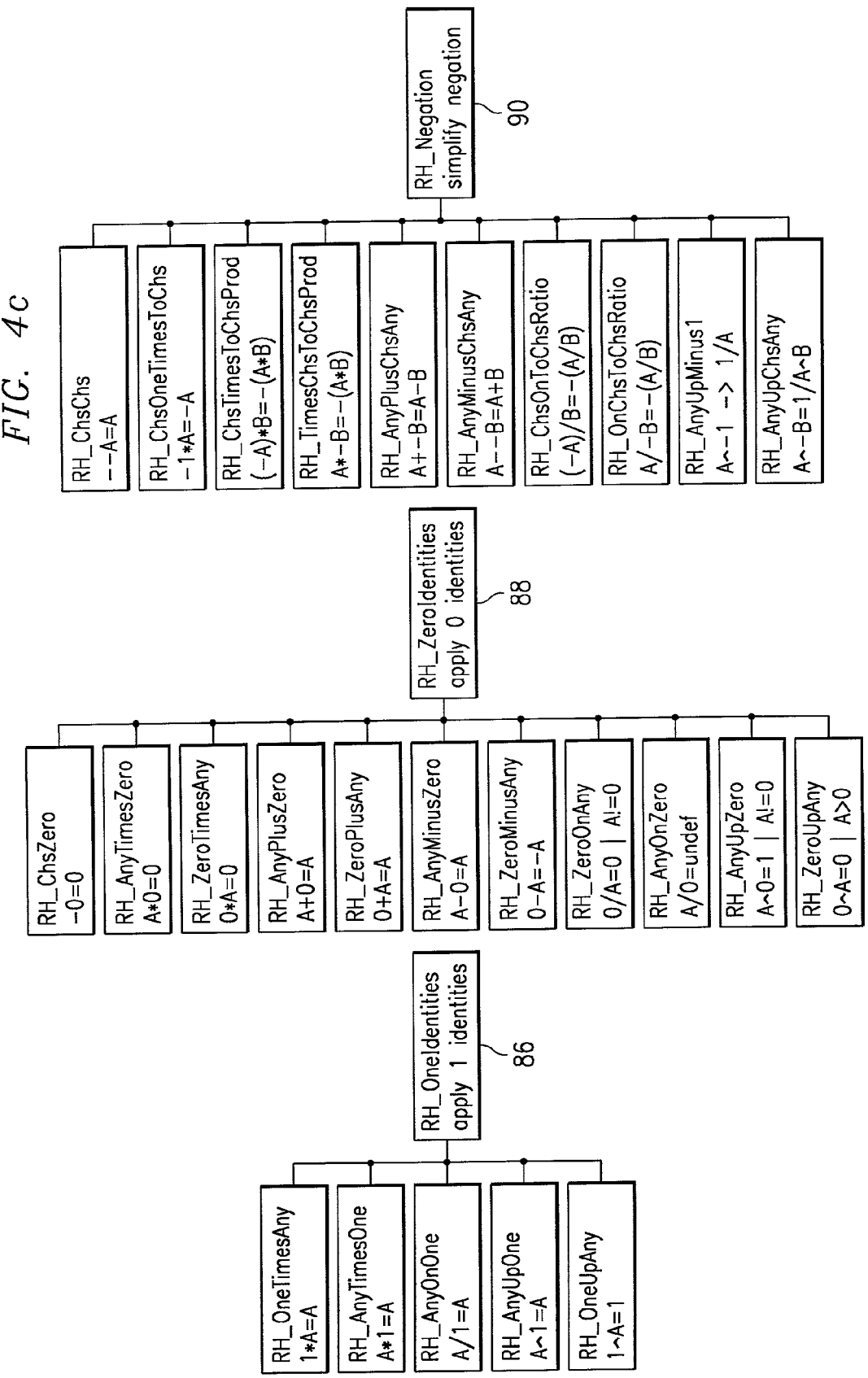
Figure 4D:
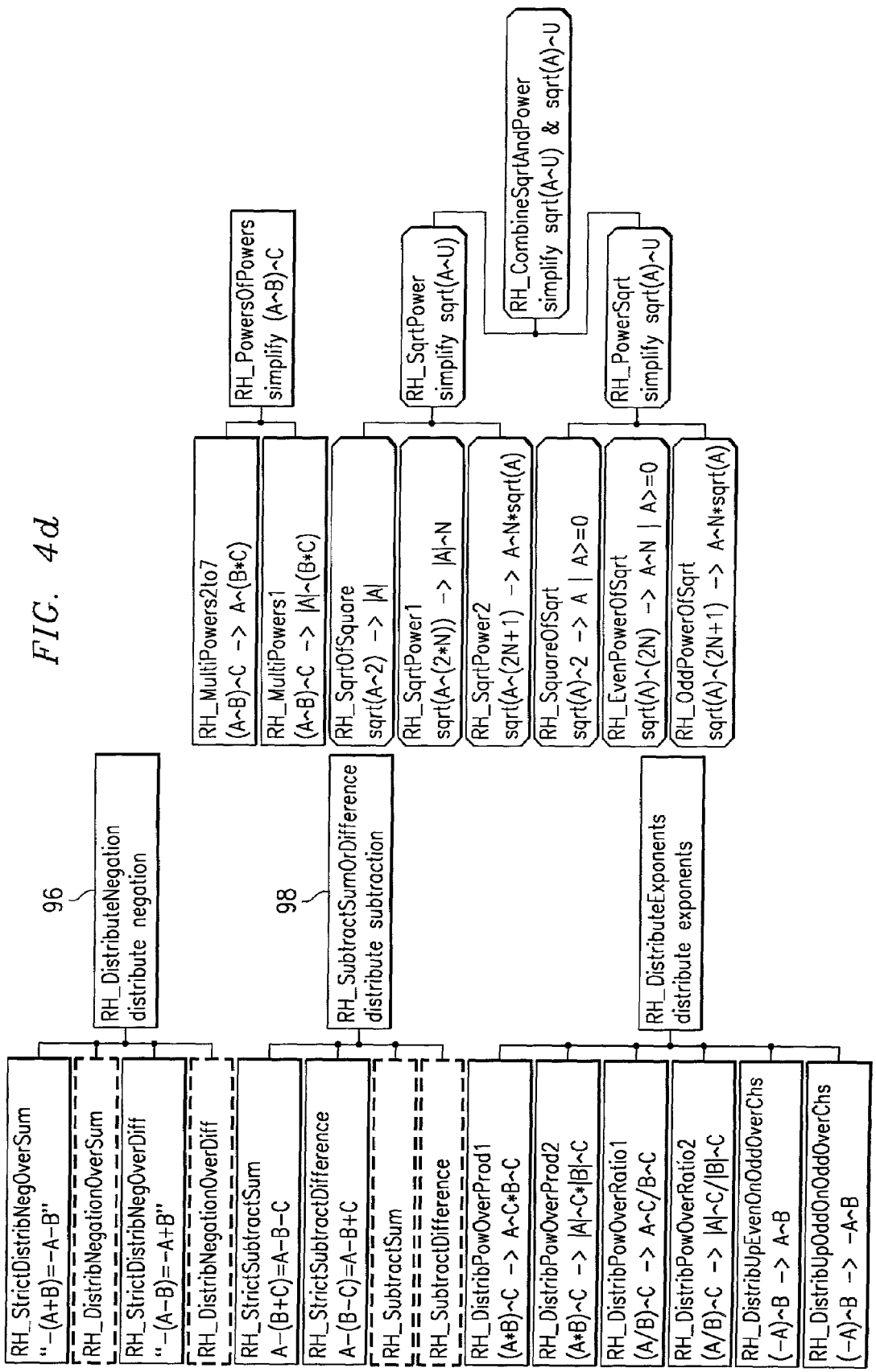
Figure 4E:
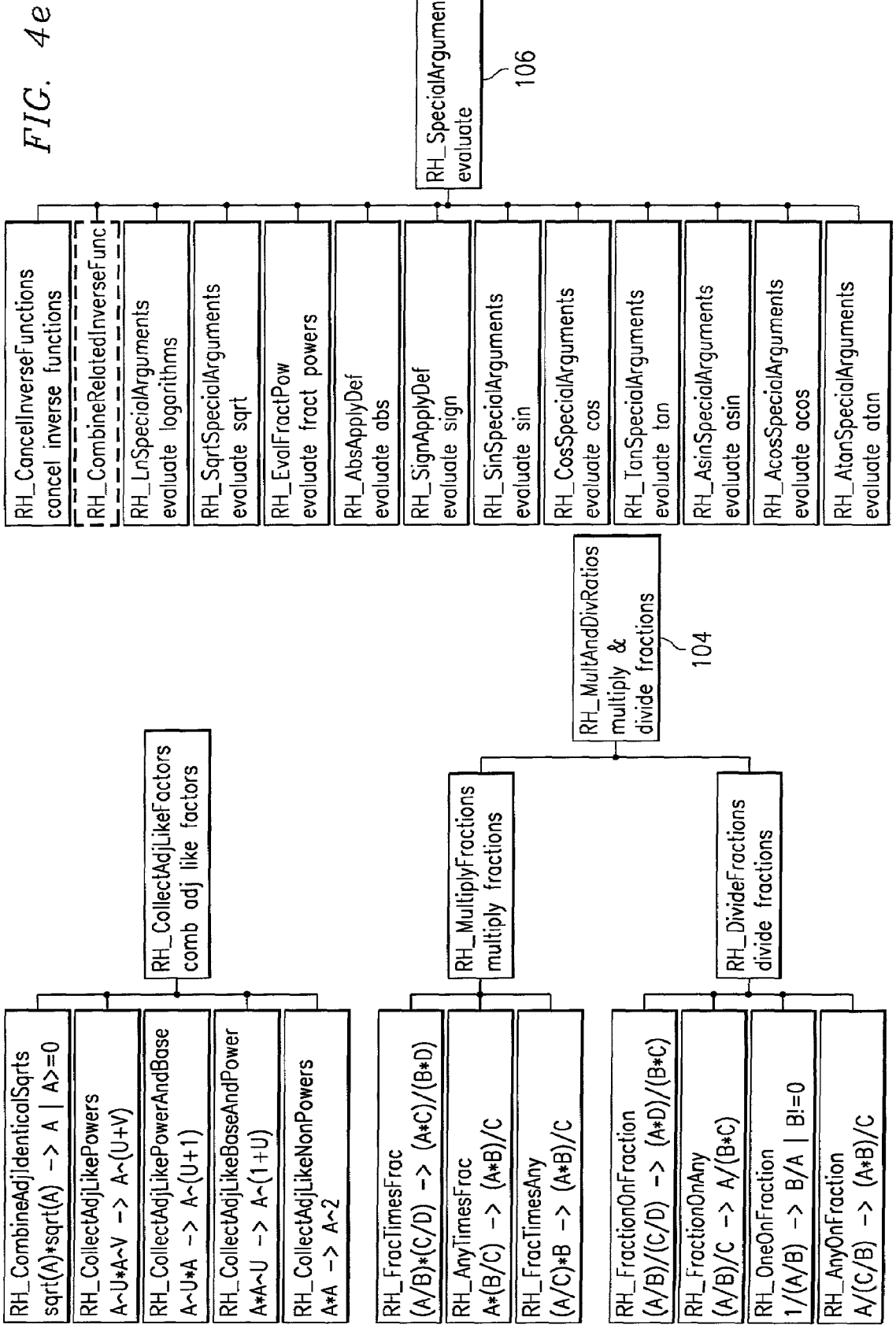
Figure 4F:
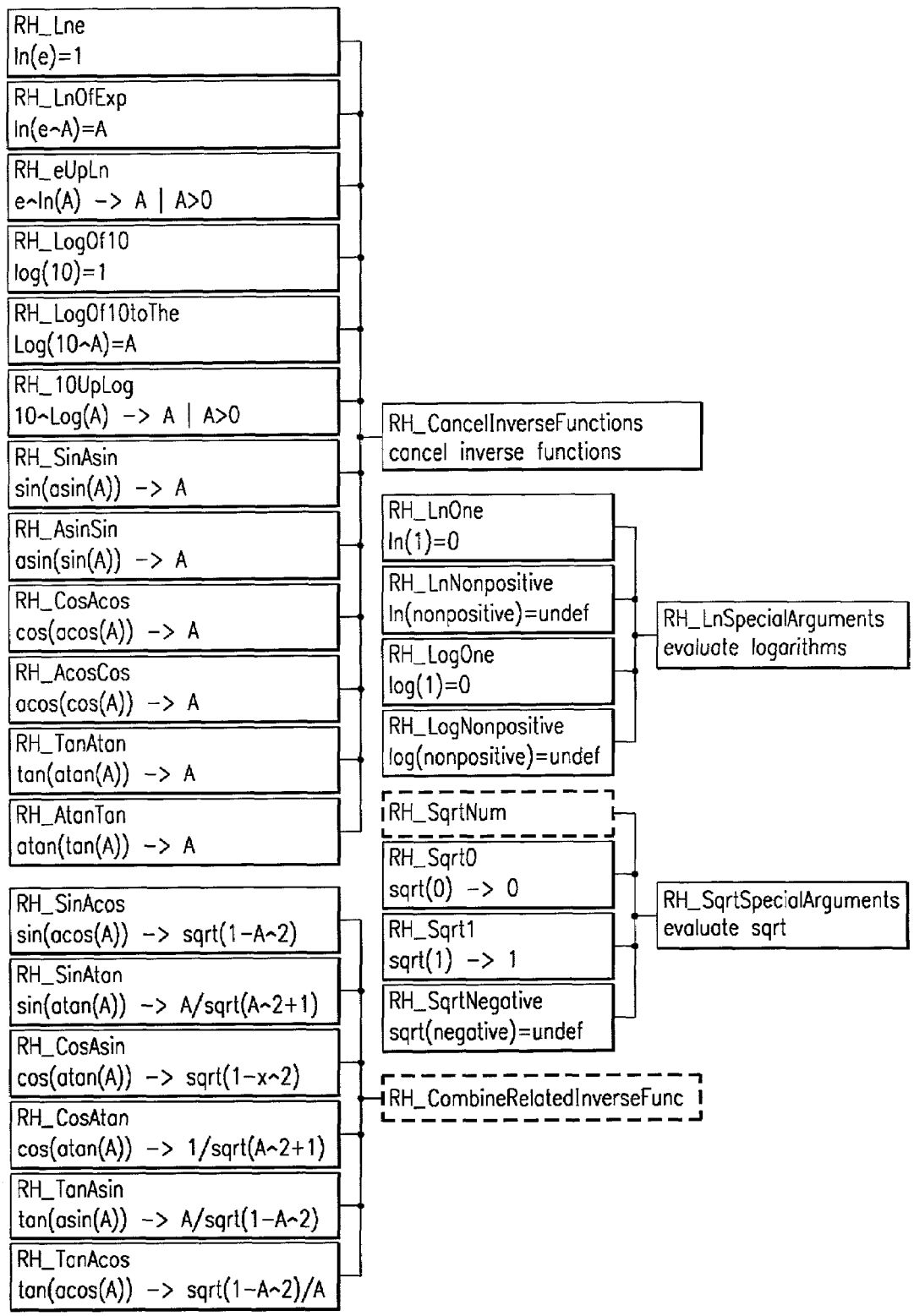
Figure 4G:
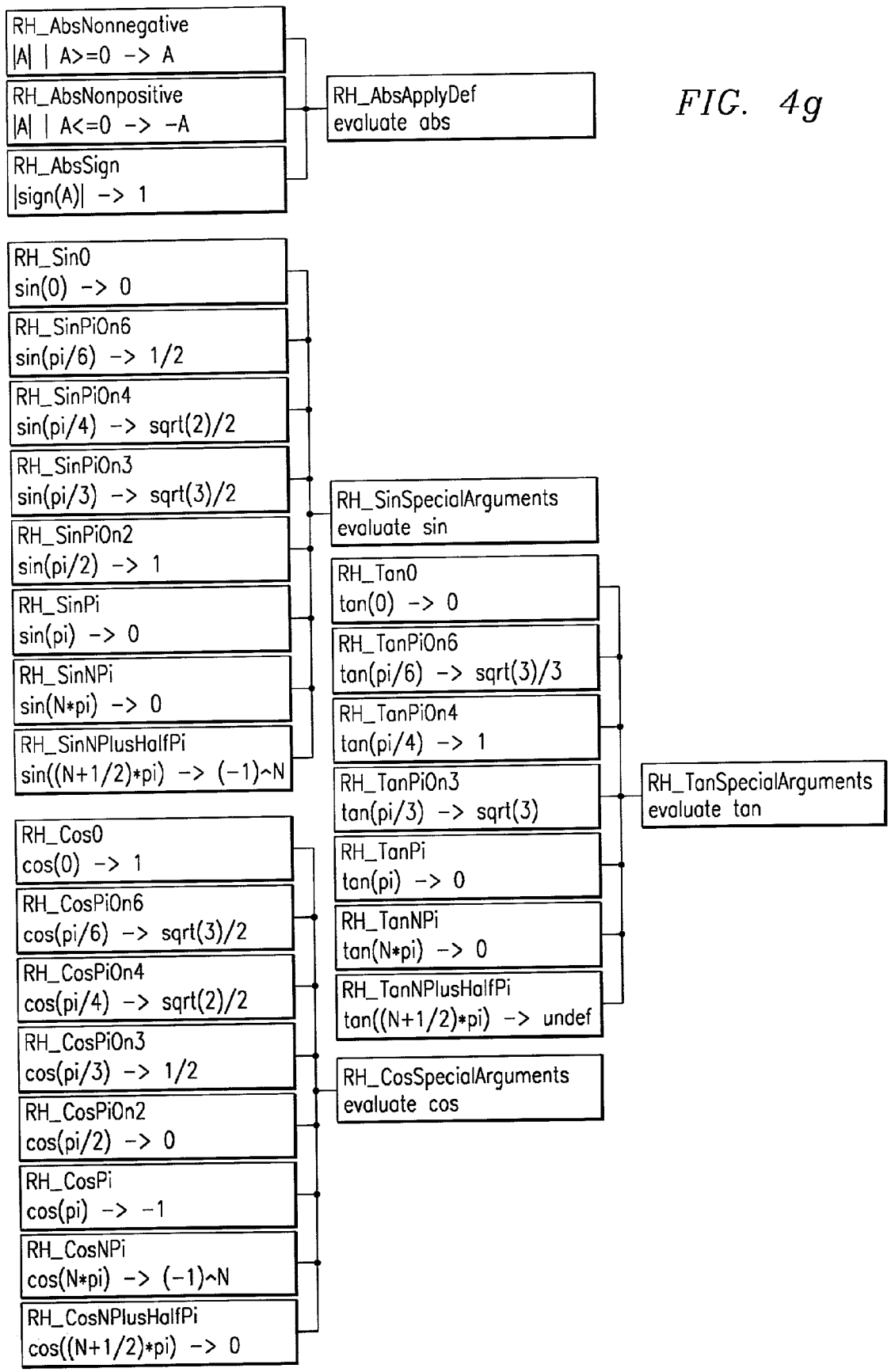
Figure 4H:
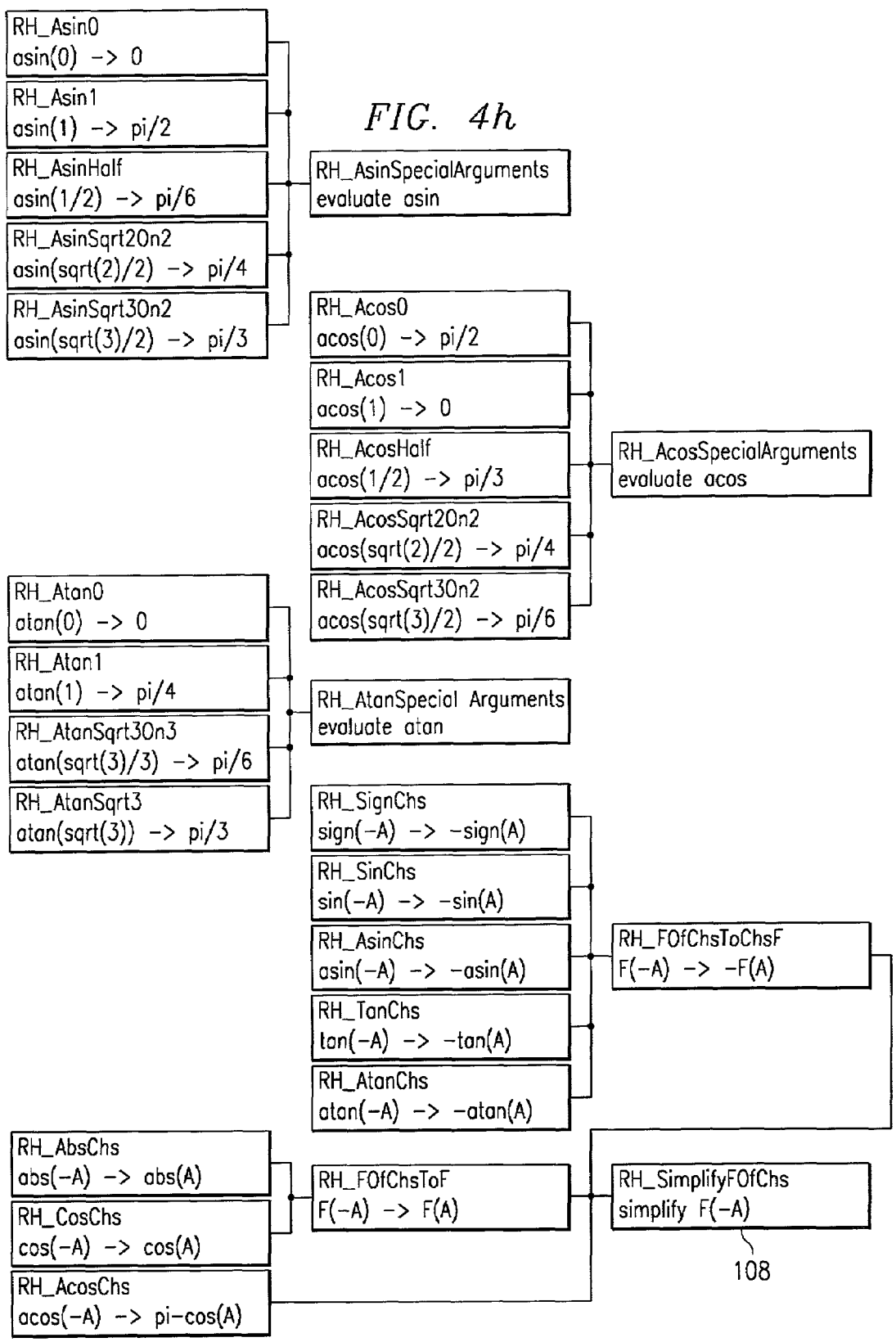
Figure 4I:
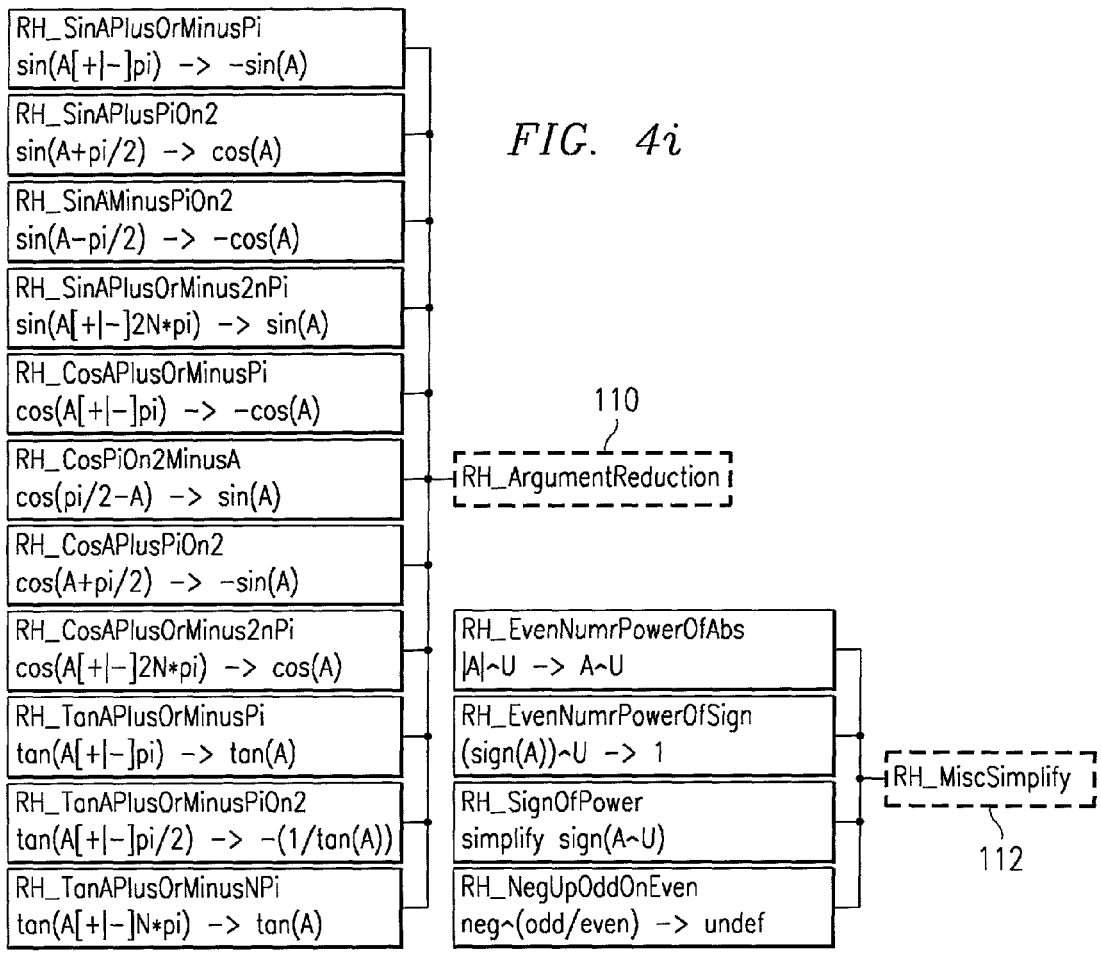
Figure 4T:
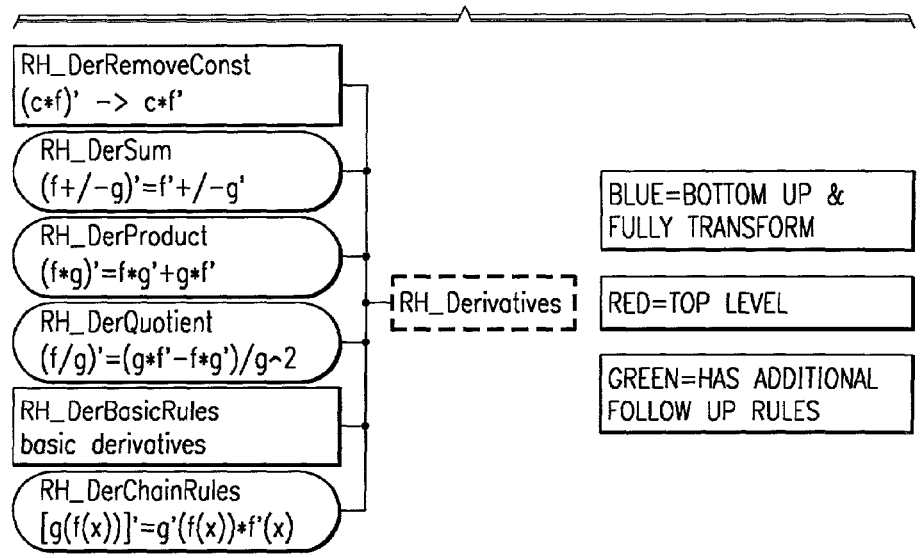
Figure 4J:
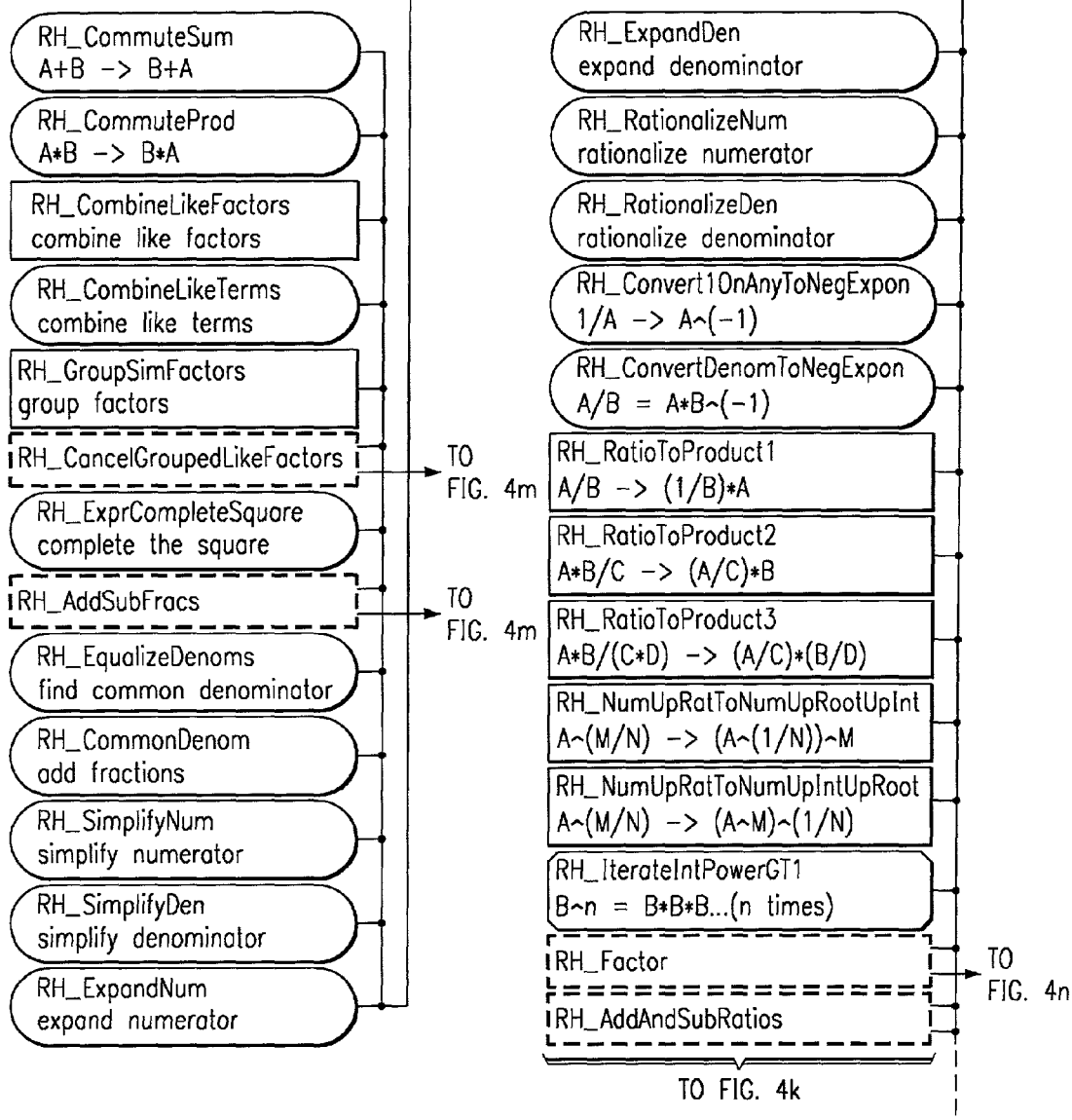
Figure 4Q:
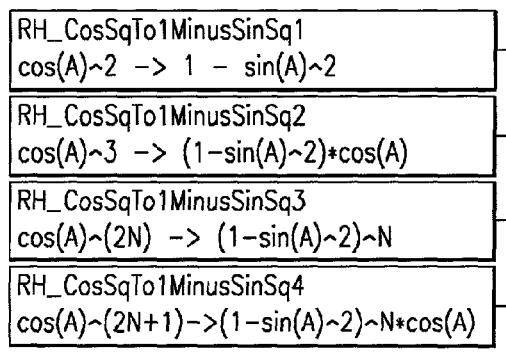
Figure 4K:
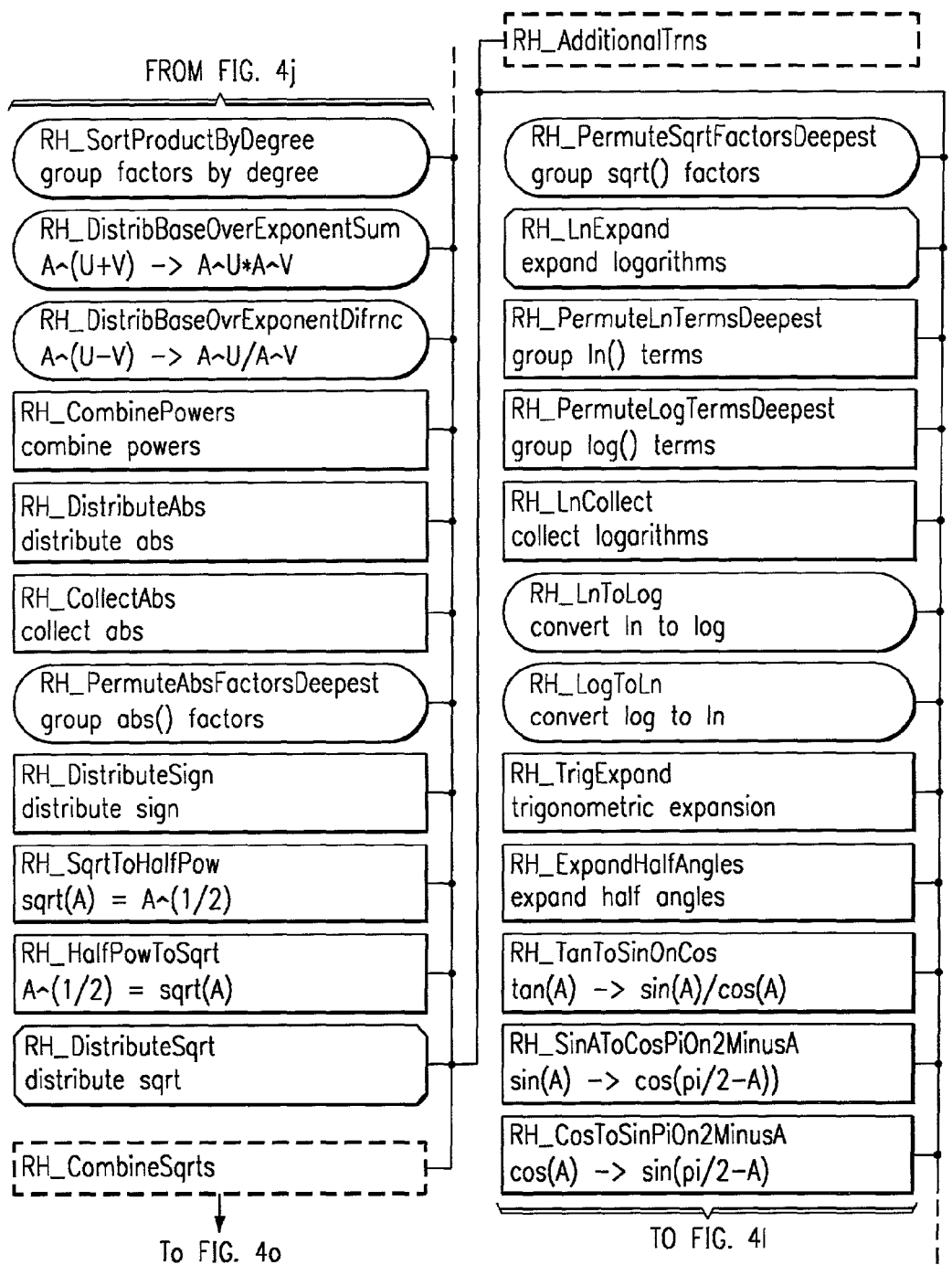
Figure 4N:
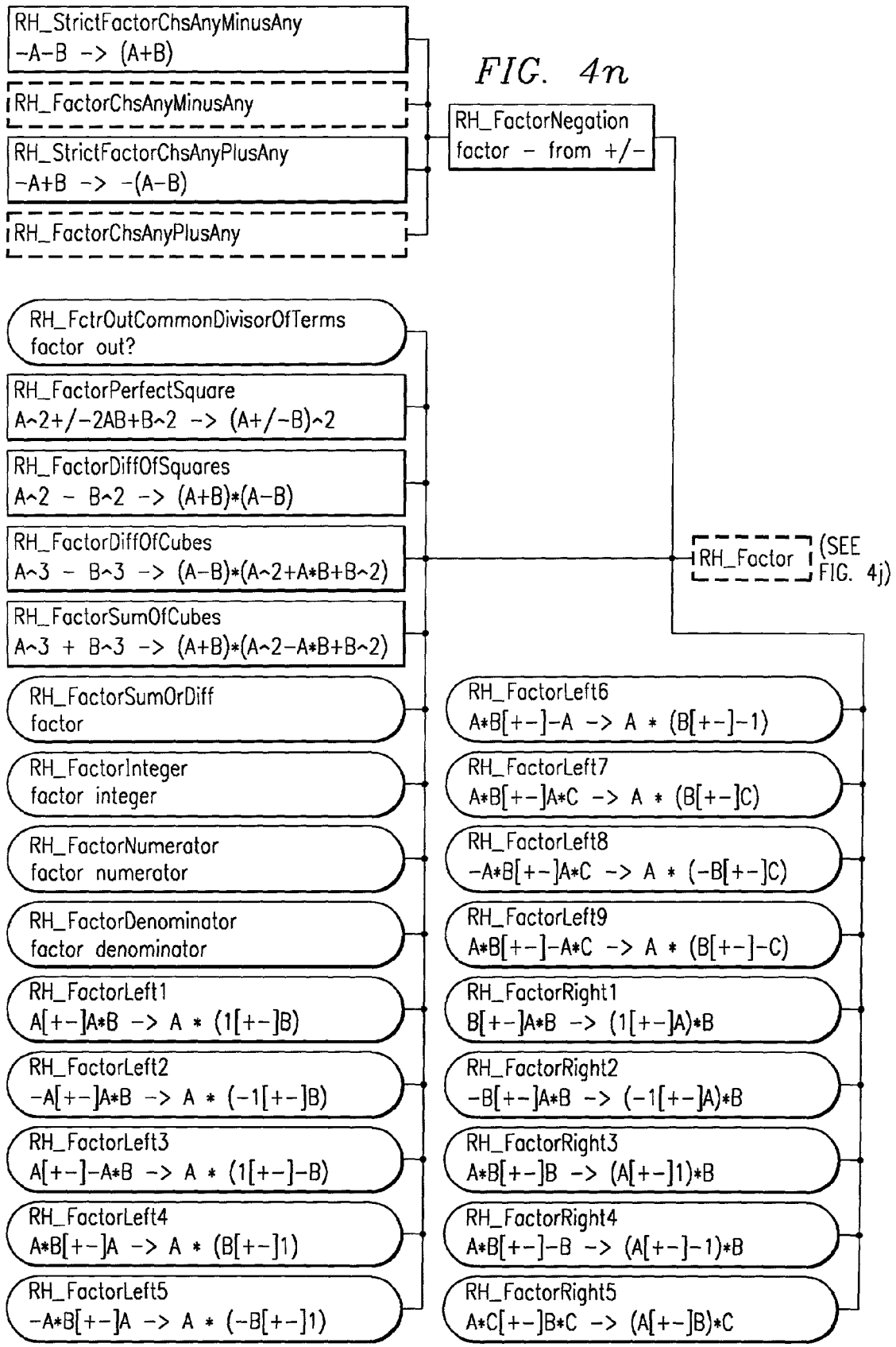
Figure 4O:
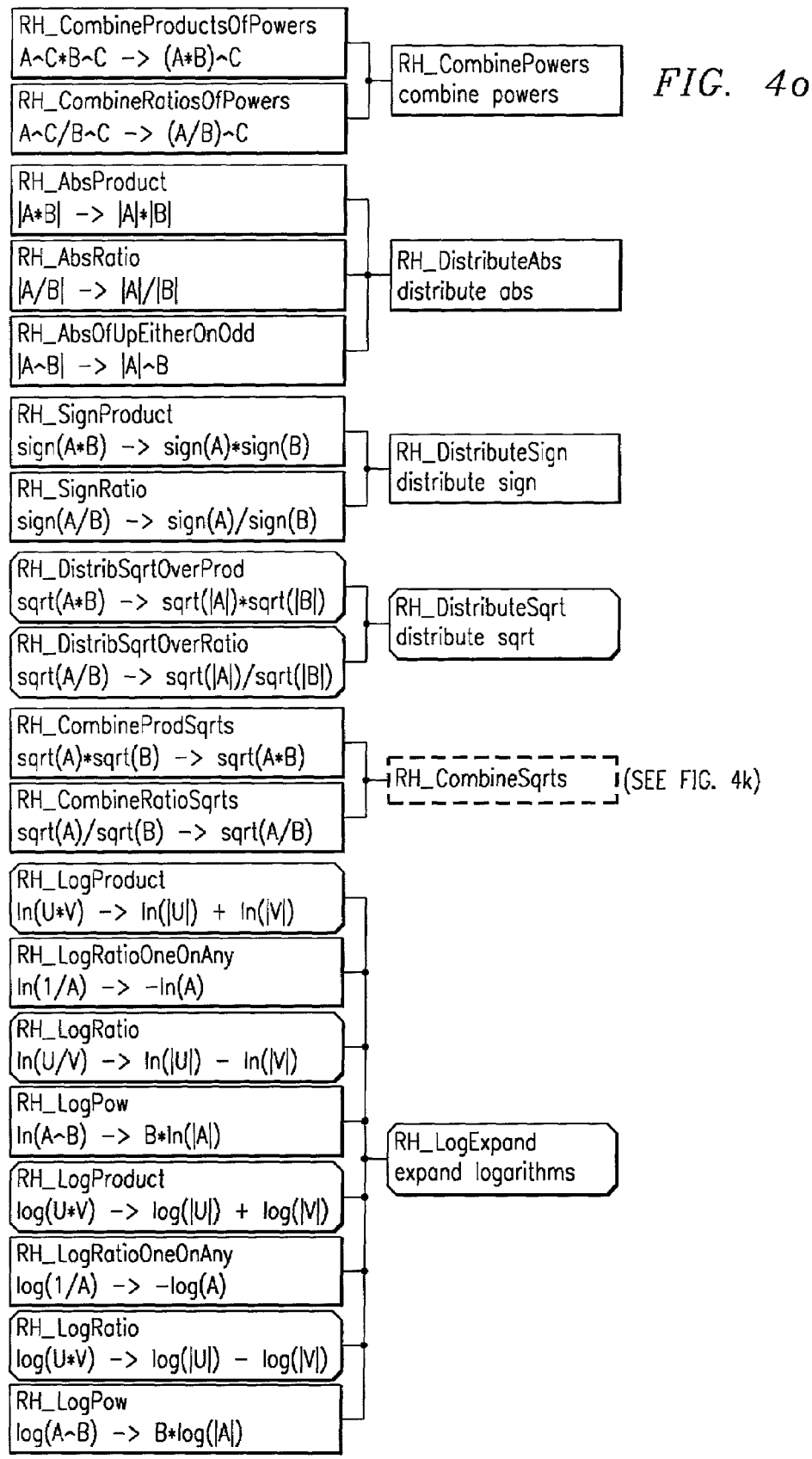
Figure 4P:
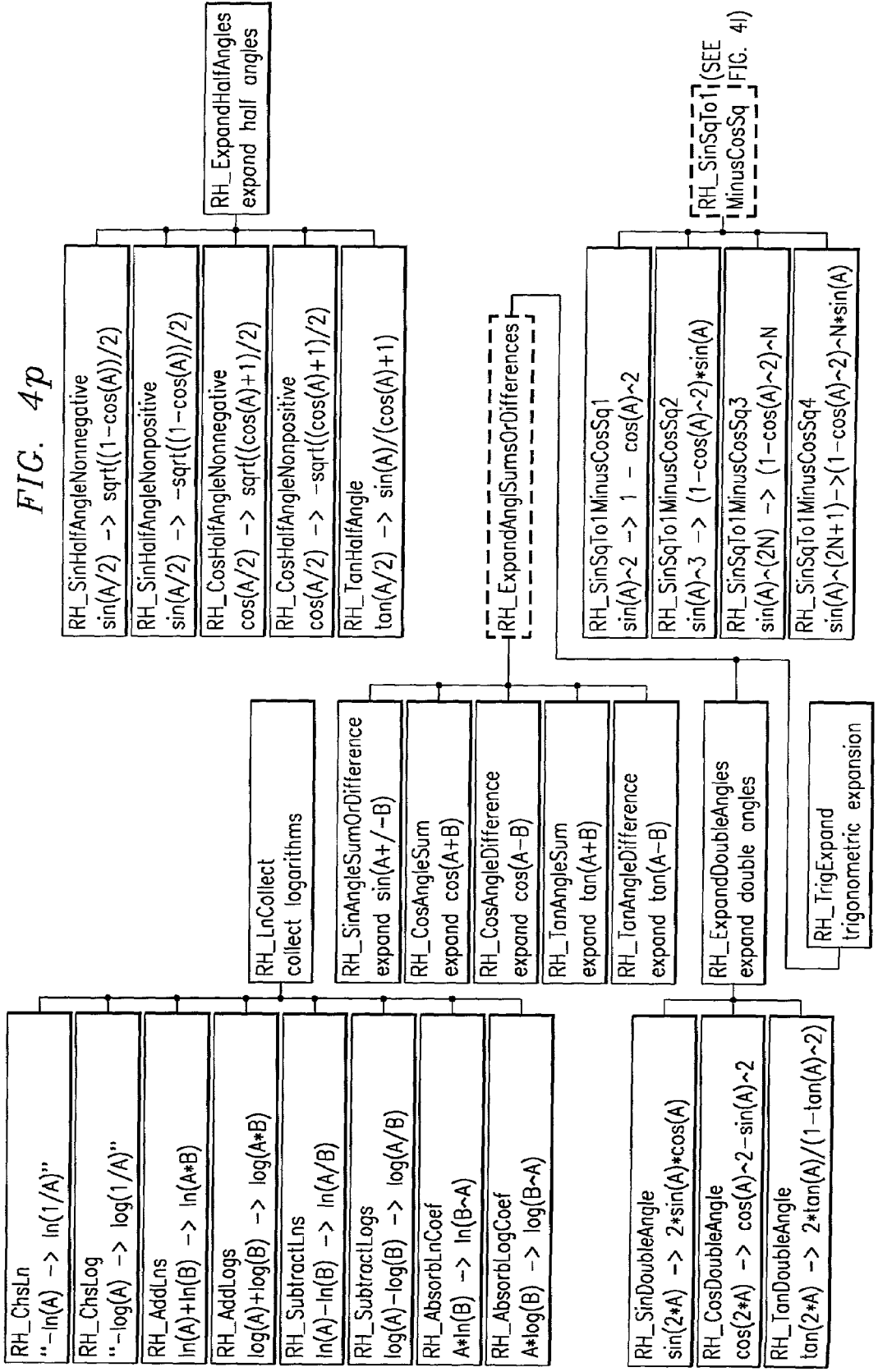
Figure 4R:
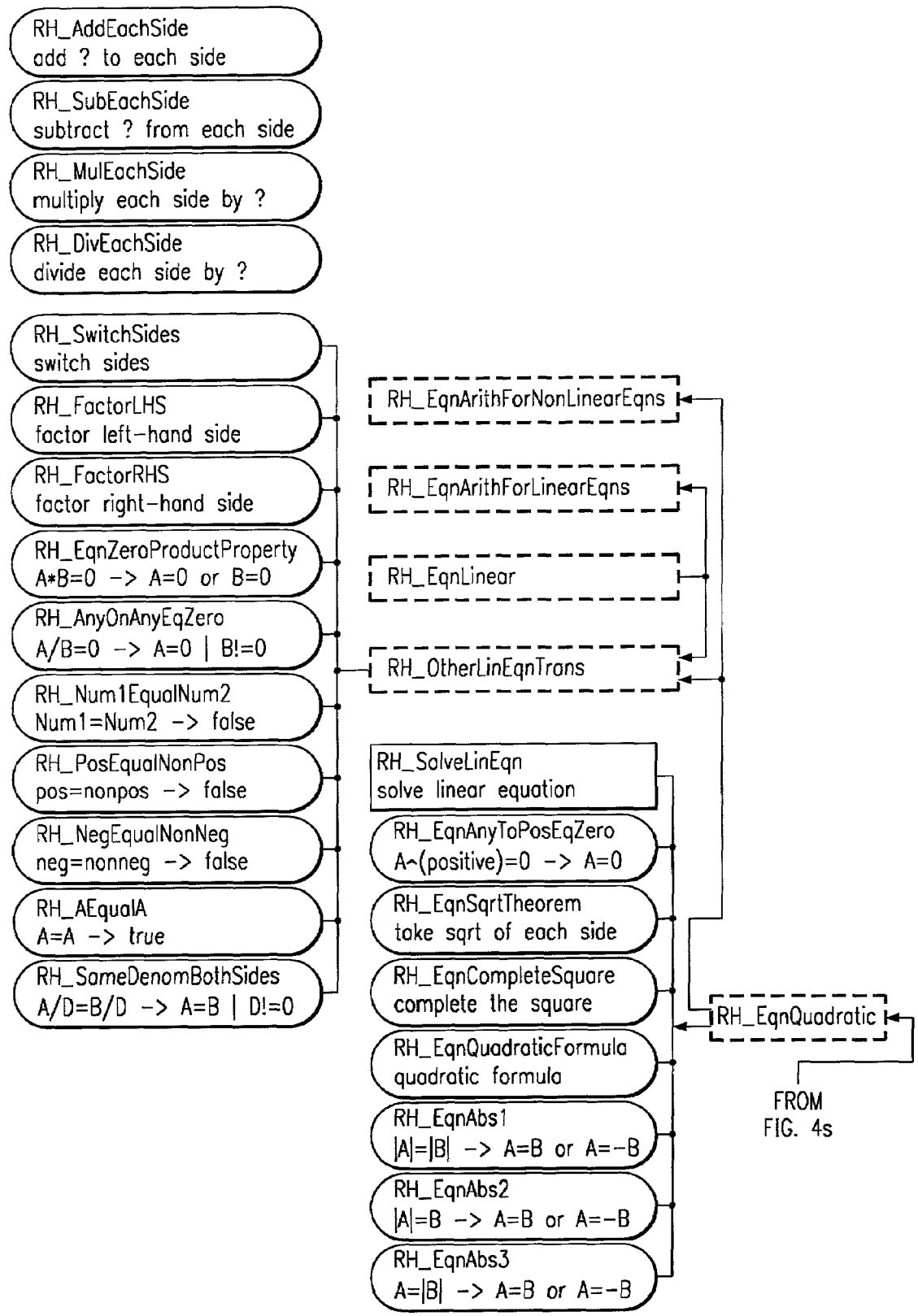
Figure 4S:
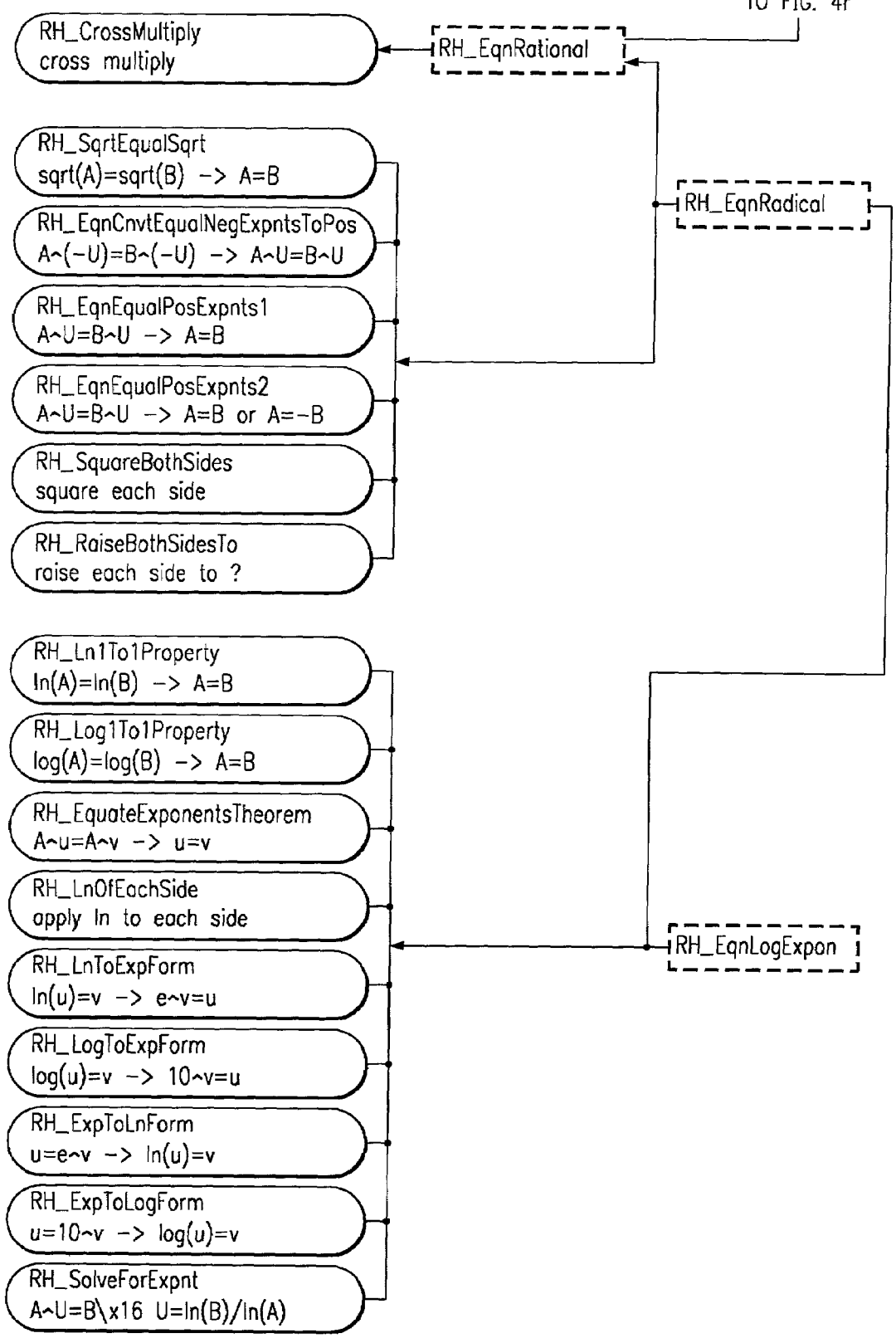

As shown in FIGS. 4*a* through 4*t* there is illustrated a portion of one version of the rule DAG suitable for use in SMG. Each node of the DAG is labeled with a descriptive variable name beginning RH_(for Rule Hierarchy). Some of the nodes are further labeled with either a rewrite rule or a phrase such as "combine adjacent like factors". Such further-labeled nodes are called "menuable", and only such menuable labels can appear on the drop down menu generated by the applicability procedure to be discussed later.

As will be appreciated, "Rewrite Rules" are carried out by "Pattern Matching" that is often highly syntactic. Therefore, several rules are often necessary to fully implement what users regard as one mathematical rule. For example, "collect adjacent like terms" involves numerous rules. Letting $\#_1$, $\#_2$, etc. match any numbers, nine of these rules are $\#_1 \cdot A + \#_2 \cdot A \to (\#_1 + \#_2) \cdot A$, $\#_1 \cdot A - \#_2 \cdot A \to (\#_1 - \#_2) \cdot A$, $\#_1 \cdot A + A \to (\#_1 + 1) \cdot A$, $\#_1 \cdot A - A \to (\#_1 - 1) \cdot A$, $\#_1 \cdot A - \#_2 \cdot A \to (\#_1 - \#_2) \cdot A$, $A + \#_2 \cdot A \to (1 + \#_2) \cdot A$, $A - \#_2 \cdot A \to (1 - \#_2) \cdot A$, $A + A \to (1 + 1) \cdot A$, $A - A \to (1 - 1) \cdot A$.

These sub-level operations or children of "collect adjacent like terms" are necessitated by the syntactic nature of our pattern matcher, and they entail more detail than is necessary for effective use by the user. Therefore, these lower level nodes and others like them wherein numeric factors occur in one or two denominators are designed to be "unmenuable" so that only their menuable parent "collect adjacent like terms" appears on the drop-down menu whenever any of the individual rules is applicable. (Note that it is common to use family-tree terminology even when a "child" might have more or fewer than 2 parents.)

Further, the DAG is carefully organized so that no menuable node has descendants, that if both were applied, could cause an infinite loop. For example, the rules $A^{-N} \to 1/A^N$ and $B/A^N \to B \cdot A^{-N}$ have no common menuable parent node, as they would continuously change the expression being worked on back and forth between formats, and thereby create an infinite loop. Therefore, the DAG is designed so that no single menu choice can make them both simultaneously active.

The Applicability Algorithm

Although the DAG approach is suitable for both the imaginary domain and the real domain, the SMG embodiment of the DAG is based only on the real domain to suit the intended educational level. More specifically, the real branch is used for fractional powers having odd reduced denominators, such as $(-8)^{1/3} \to -2$; and the Domain Of Definition (dod) of an expression is the mutual set of values of its variables for which the expression and all of its sub-expressions are real and finite.

SMG uses a procedure called Domain Preservation Constraints to preserve strict equivalence of the sequence of expressions in a derivation. Thus, successive expressions have the same dod. The Domain Preservation Constraints procedure is described in a previous patent application by David Stoutemyer titled "Domain Preservation Constraints for Computer Algebra". An example of a rule that generates such a constraint is $A^0 \to 1 | A \neq 0$ and dod(A). As will be appreciated, when A=0, the expression $A^0$ is undefined; and A itself might have a restricted domain of definition. For example, $(\sqrt{x})^0 \to 1 | x \neq 0$ and $x \geq 0$, which simplifies to $1 | x > 0$, where "|" denotes "such that".

Some rules have rather elaborate conditions. For example, the rule $(A \cdot B)^C \to A^C \cdot B^C$ requires that A or B be nonnegative or that C is integer or has an odd denominator. For brevity, such conditions and domain preservation constraints are omitted in the following discussion, and the reader is referred to the Stoutemyer patent application Ser. No. 09/902,990, filed on Jul. 11, 2000.

It is desirable to apply some rules only to the top level of a highlighted expression or sub-expression. For example, if $x \cdot \sqrt{(y \cdot z)}$ is highlighted, it gives the user more control if the rule $A \cdot B \to B \cdot A$ applies only to x and the square root, rather than also applying to $y \cdot z$.

It is often desirable to apply other rules throughout a highlighted expression or sub-expression. For example, if $0 \cdot x + 0 \cdot y$ is highlighted, most users will want the rule $0 \cdot A \to 0$ to be applicable and apply to both instances.

For either type of rule, applying an initially-applicable rewrite rule might produce an opportunity to apply another rewrite rule that wasn't applicable to the original expression. For example, the rule "$A^0 \to 1$" is applicable to the expression $c^0 \cdot x$, but applying the rule creates an opportunity for the rule $1 \cdot B \to B$. However, it would generally be prohibitively time-consuming to determine the transitive closure or ultimate applicability by actually doing all possible sequences of successive applicable transformations. Moreover, the emphasis for SMG is doing derivation, or problem solving step by step, so there is no need to determine beyond initial applicability.

It is helpful to place the most specific possible labels on the menu. For example, for the sub-expression $(x+y)^1$, it is advantageous to place "$A^1 \to A$" on the menu rather than to place "apply 1 identities."

However, "apply 1 identities" should still be placed on the menu for the sub-expression $1 \cdot (x+y)^1$ because if only "$1 \cdot A \to A$" and "$B^1 \to B$" are on the menu, the user can't make them both apply during one interaction cycle. Further, as long as the final menu is not too lengthy, it is best to have all three of these items on the menu for maximum flexibility. However, it is not a good idea to place also "apply 0 & 1 identities" on the menu even though it is a menuable parent of "apply 1 identities", because "apply 0 & 1 identities" is less specific and adds no initially-applicable rules that aren't already covered by "apply 1 identities".

Thus, an important goal of applying the applicability function is building a global stack of pointers to all applicable menuable rule nodes and the closest menuable ancestor set node of applicable unmenuable rule nodes and the closest menuable common ancestor set node of any two or more applicable rule nodes.

If each applicable rule is either menuable or has a menuable parent, the pointer stack constructed according to these principles necessarily covers every applicable rule in the most specific possible way. It will be appreciated, of course, that a rule cannot be covered by a menu item unless it or one of its ancestors in the DAG passed to the applicability function was menuable.

If every pair of applicable rules has a menuable common ancestor, this pointer stack also necessarily allows the user to request simultaneous application of all or any menuable subset of the applicable rules in the most specific possible way consistent with the DAG.

In contrast, suppose the top-level node passed to the applicability function is unmenuable and two or more of its children are applicable. Then there is no way for one menu choice to select more than one of these children. For this reason, some unmenuable nodes are included for checking the applicability of alternative children nodes that would cause an infinite loop if used together. For example, the common ancestors of the rule $A^{1/2} \to \sqrt{A}$ and the rule $\sqrt{A} \to A^{1/2}$ are intentionally set to be unmenuable.

To help with the optional subsequent pruning pass, to be discussed below, the present embodiment also stores an indication of the menuable depth with each pointer in the applicability stack. The menuable depth represents the inclusive number of menuable nodes between a node and the node initially given to the applicability function. For example, a menuable node is depth 2 if it has one menuable ancestor inclusively between it and the node initially given to the applicability function.

Besides producing a stack of pairs, with each pair consisting of a pointer to a rule node together with its menuable depth, the applicability function also returns an indication of whether or not the node or any of its descendants is applicable and an indication of whether or not all of the applicable descendants of the node have been covered by items already pushed on the applicability stack.

Given a users' expression or sub-expression and a node in the rule DAG, the applicability function does a recursive post-order traversal of the sub-DAG starting at that node. In other words, if the given node is a set node, then the algorithm is first recursively applied to all of its children nodes, then those resulting returned values are combined into an appropriate return value for the given set node. The global stack of pairs is accumulated during this process. As is well known to computer scientists, this and any recursive algorithm can be realized by a non-recursive program that uses auxiliary stacks for return points and for arguments and local variables used in the recursive realization. However, recursive realizations are usually more understandable and compact.

The menuable depth is computed during this traversal by starting with 0 and incrementing by a call-by-value depth argument whenever a menuable node is encountered.

Figure 5:
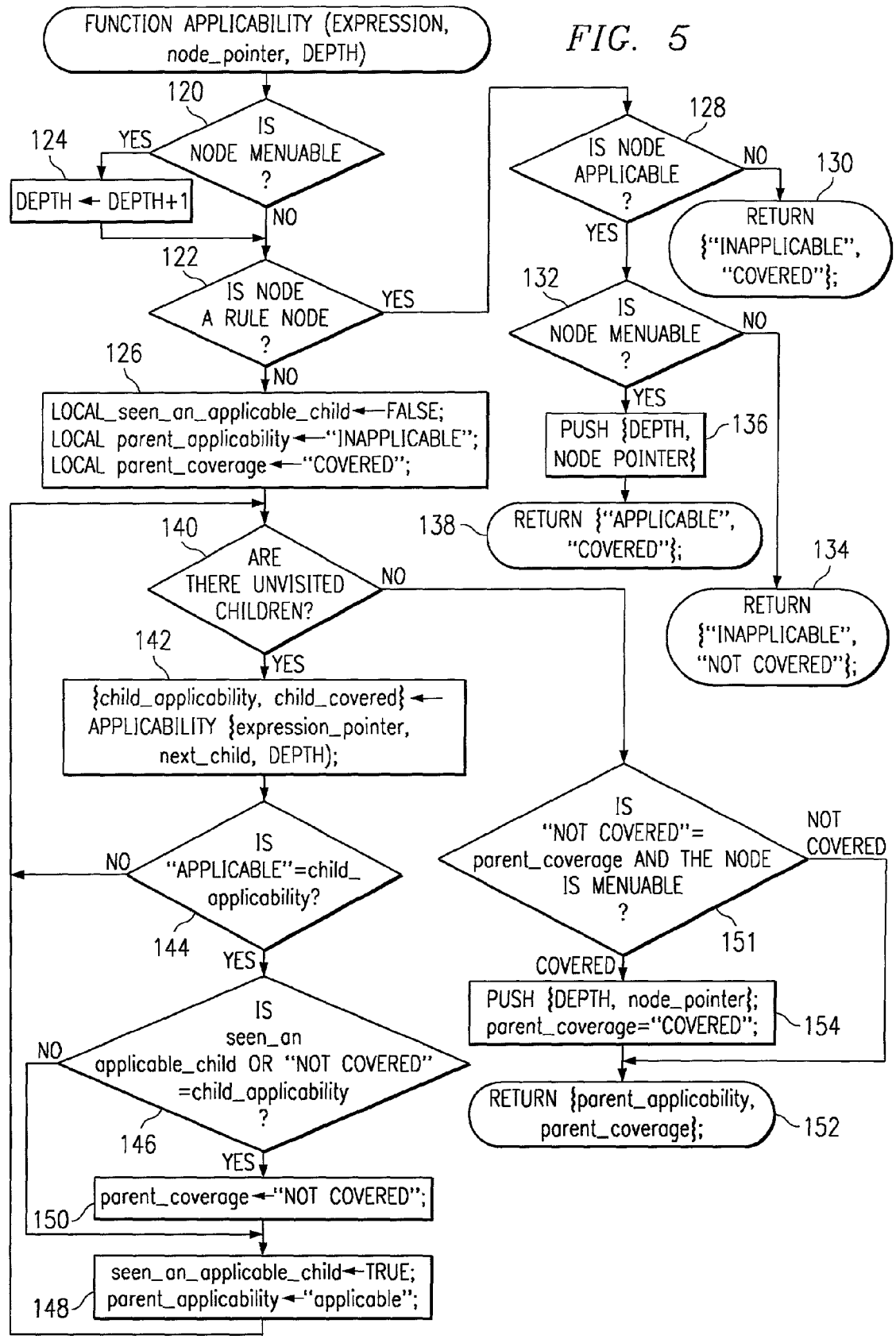
FIG. 5 is a flow diagram of the "Applicability Algorithm" incorporating features of this invention.

More specifically and as will be appreciated by those skilled in the art, for more in-depth explanation, Table 1 provides a pseudo-code version of the applicability function, wherein arguments are passed call-by-value. FIG. 5 is a corresponding flow chart and will be discussed later.

TABLE I

```
applicability (expression_pointer, node_pointer, depth)
{   if the node is menuable, then depth ← depth + 1;
    if the node is a rule node, then
        If the node is applicable, then
            If the node is menuable, then  {   push [depth,
                                                node_pointer];
                                            return {"applicable",
                                                "covered"};
                                            }
            else return ["applicable", "not covered"];
        else return ["inapplicable", "covered"];
    else
    {   local seen_an_applicable_child ← false;
        local parent_applicability ← "inapplicable";
        local parent_coverage ← "covered";
        while there are unvisited children
        {   [child_applicability, child._3covered] ←
                                    applicability (expression_pointer, next
                                        child, depth);
            if "applicable" = child_applicability, then
            {   if seen_an_applicable_child or
                "not covered" = child_covered, then
                    parent_coverage ← "not covered";
                seen_an_applicable_child = true;
                parent_applicability ← "applicable";
            }
        }
        if "not covered" = parent_coverage and
        the node is menuable, then
        {   push [depth, node_pointer];
            parent_coverage = "covered";
        }
        return [parent_applicability, parent_coverage];
    }
}.
```

It is distracting to place some of the less frequently desired rules on the menu except when they are applicable at the top level of the user's expression or highlighted sub-expression. Two such examples are $A/B^N \to A \cdot B^{-N}$ and $A^N | N > 1 \to A \cdot A^{N-1}$. Consequently, some of the rule nodes are designated as top-level only, and the algorithm doesn't recursively visit sub-expressions to determine applicability of such rules.

However, in some contexts, it is important to have the applicability of all rules under a node initially passed to the applicability function be tested at the top-level only. Therefore, according to the embodiment, another argument has been added to the applicability function to indicate the choice between testing applicability at the top-level only even for ones that are not designated as top-level only. Moreover, to provide additional information, the applicability component of the return value is actually one of "inapplicable", "applicable but not top level", and "applicable at the top level". For simplicity, such detail has been omitted from the above pseudo code, and from the corresponding flow diagram in FIG. 5.

When the applicability of a rule is desired at all levels, the applicability is determined by a recursive depth-first traversal of the provided expression argument. If the rule is applicable to a sub-expression thereof, no further search is necessary or done for that rule.

The Pruning Algorithm

If the applicability algorithm collects pointers to more menuable nodes than is convenient or allowed to be displayed, then it is better to prune only those rules that do not reduce coverage of all necessary applicable rules. For example, if the applicability function receives a pointer to the expression $0+0 \cdot x+y \cdot 0+0/z+k^0+0^c+0$ and a pointer to the "apply 0 identities" node, with argument depth 0, it will collect pointers for the seven depth 2 nodes $0+A\to A$, $0\cdot A\to 0$, $A\cdot 0\to 0$, $0/A\to 0$, $A^0\to 1$, $0^A\to 0$, and $A+0\to 0$, together with the one depth 1 node "apply 0 identities". However, if it is intended to limit the menu count to seven items, and the depth 1 node is pruned, then the user is precluded from requesting simultaneous application of all the applicable rules. Therefore, it is better to prune one of the depth 2 nodes. More generally, if it is necessary to prune nodes to meet a menu count limitation, then it is better to prune the deepest nodes first. However, SMG menus are scrollable, so level 1 nodes are never pruned even if the total is greater than a count limitation imposed to save display space. Thus, the pruning algorithm never reduces coverage of applicable rules.

Figure 6:
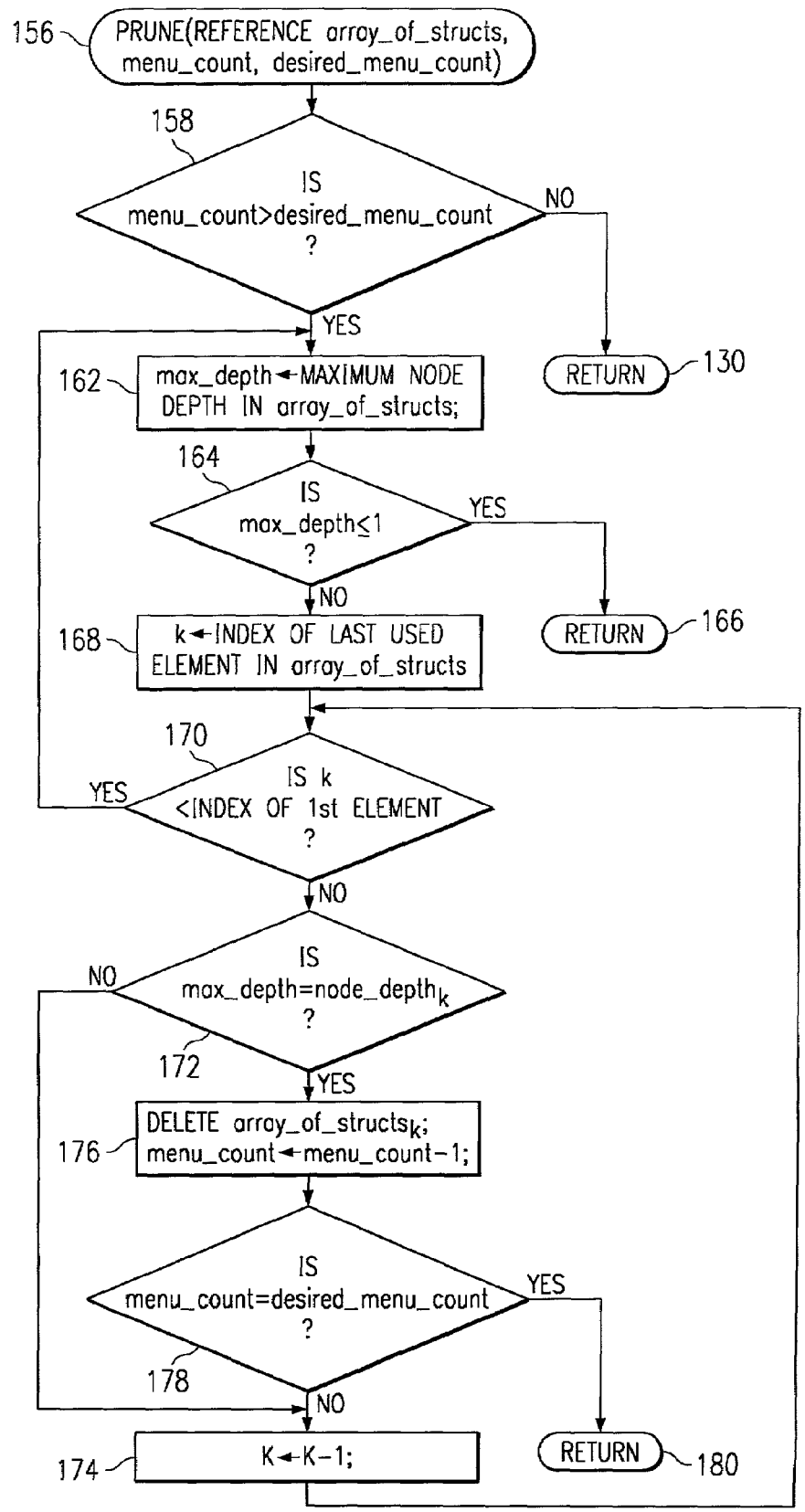
FIG. 6 is a flow diagram of the "Pruning Algorithm" incorporating features of the invention.

The stack produced by the above applicability function is actually a partially-filled array of structures, with each structure containing a depth and a pointer to a node in the DAG. The pruning algorithm is described in pseudo code in Table II. FIG. 6 is a corresponding flow chart that is discussed later.

TABLE II

```
prune (array_of_structs, desired_menu_count)
{    local menu_count, max_depth;
menu_count ← number of used elements of array_of_structs;
if menu_count > desired_menu_count,
then
        for (;;)
        {   max_depth ← maximum depth in the array;
        if max_depth ≤ 1, then return;
        for each successive used element of the array;
                if depth = max_depth; then
                {   delete the element;
                    menu_count = menu_count − 1;
                    if menu_count = desired_menu_count, then
                        return;
                }
        }
}
```

For a particular sub-expression, only patterns that have the same top-level operator or function name as that sub-expression can match the sub-expression. Therefore it increases the efficiency of matching to collect all of the selected rules for "+" into one "bucket", all of the selected rules for sin( . . . ) into another bucket, etc., then test only the bucket having the same top-level operator as the sub-expression.

Also, within each bucket it is advantageous to test the rules according to a predetermined order. If a rule is a special case of another rule in the same bucket, then it is important to test the more specialized rule first. Otherwise the more specialized rule will never be reached. For example, it is important to test the rule $A/B-C/B\to(A-C)/B$ before testing the rule $A/B-C/D\to(A\cdot D-B\cdot C)/(B\cdot D)$ to avoid, for example, transforming $x/y-z/y$ to $(x\cdot y-z\cdot y)/(y\cdot y)$, which introduces an unnecessary common factor y in the numerator and denominator. Beyond such partial orderings, it is also advantageous to order the rules so that the most commonly used rules and most quickly tested rules are tried before less commonly used and more slowly tested rules. It seems possible that the necessary ordering constraints and perhaps also most efficiency ordering preferences can be accommodated for SMG merely by careful ordering of the descendants of set nodes in the DAG. However, for guaranteed control, SMG also includes a pre-assigned priority ranking with each rule, and this ranking is taken into account as rules are merged into buckets.

The Bucket-building Algorithm

The bucket-building algorithm simply traverses the user-selected sub-DAG depth first, appending pointers to the rules therein into a partially filled array. This array is then sorted primarily by the top-level operator in the patterns, with ties broken according to the pre-assigned priorities. Null pointers are used to separate the sub-arrays that share the same top-level operator. Finally, to facilitate rapid access to the appropriate sub-array, an index table of pairs is constructed, with each table consisting of an operator or function-name code together with a pointer to the beginning of the corresponding sub-array.

Variations on this technique may include maintaining rule order in the buckets as they are built in separate arrays or linked lists.

The Transformation Algorithm

One approach to testing a pattern and an optional condition against every sub-expression is bottom up, which tests against the smallest sub-expressions, then successively larger sub-expression and finally the entire expression. Another approach is top down, which first tests against the entire expression, then successively smaller sub-expressions. It is believed that the bottom up approach is usually faster, so that is the technique implemented in the SMG DAG.

For example, consider transforming $x\cdot x+x^2$ with a set of rules that includes $A+A\to 2\cdot A$ and $B\cdot B\to B^2$: With a top-down implementation, the initial attempt to recognize like terms fails, then $x\cdot x$ is simplified to $x^2$, after which the second attempt to recognize like terms succeeds. In contrast, bottom-up implementation makes only one attempt to recognize like terms, which succeeds.

However, even though a bottom up approach has been selected for the SMG embodiment discussed herein, it will be appreciated that a top down approach will also work. Either way, a recursive implementation is the most straightforward approach.

The most common description of rewrite rules is to have an outer loop that repeats until no further transformation occurs. Within this loop is an inner loop over the rules. If matching is applied everywhere in the expression rather than merely at the top level, there will be a recursion over all of the sub-expressions within the inner loop.

For reasons similar to those discussed above, it is better to loop over the rules within the recursion over sub-expressions.

One way to eliminate the outer loop that repeats the entire process until no further transformation occurs is to apply the bottom-up recursion in a way that makes the result of each transformation idem potent with respect to the set of rules, eliminating any need to re-apply those rules to any of the recursive results. For example, consider bottom-up transformation of $s\cdot(x\cdot x+s)$ using the rules $A\cdot A\to A^2$, and $B\cdot(C+D)\to B\cdot C+B\cdot D$: For example, $x\cdot x\to x^2$, then $s\cdot(x^2+s)\to s\cdot x^2+s\cdot s$, in which $s\cdot s\to s^2$, giving the final result $s\cdot x^2+s^2$.

There was no need to re-simplify $x^2$ corresponding to pattern variable C in the previous steps, but there was a need to transform the product $s\cdot s$ corresponding to the replacement pattern sub-expression $B\cdot D$. In general, while creating the transformed user expression from a replacement pattern, there is no need to revisit any user sub-expressions that correspond to pattern variables. However, the rule set might be applicable to the top-level of any user sub-expression of the replacement that corresponds to a more complicated part of the replacement pattern.

Thus, the replacement is done by a recursive post-order traversal of the replacement pattern, as opposed to the user's often larger (perhaps partially transformed) expression.

Whenever this recursion reaches a constant such as 1, the constant is returned. Also, whenever the recursion reaches a pattern variable the corresponding sub-expression in the user's (perhaps partially transformed) expression is returned. Otherwise, the replacement pattern is an operator or a function with zero or more operands. This algorithm is recursively applied to those operands, forming an expression with the given operator or function and the resulting (perhaps transformed) operands. Then, the rules are applied only to the top level of this resulting expression.

When the pattern variables correspond to large user sub-expressions (such as when matching nearer the top level of large user expressions), this restriction of the recursive follow-up to the pattern sub-expressions is significantly more efficient than revisiting all the way to the bottom of the partially transformed user expression.

Some rule patterns might delve deeper into the transformed user expression. For example, this would happen in the above example if s was actually sin(y·z) and another active rule was $(\sin(U))^2 \rightarrow 1-(\cos(U))^2$. However, this is quite different from gratuitously always starting over at the bottom level of the user's (perhaps partially transformed) expression whenever any transformation occurs. For example, there is no need to revisit the y·z in sin(y·z).

Also, as indicated above, two sets of rule-buckets are passed to the transformation function. One set contains triggering rules and the other contains follow-up rules, and may be the same set. However, if the follow-up set contains rules that aren't in the triggering set, then it is possible that there are opportunities for the follow-up rules in transformed sub-expressions that wouldn't be exploited by limiting follow up to the top level of sub-expressions of the replacement pattern. For example, suppose the triggering rule set is $\{A^N \cdot A^M \rightarrow A^{N+M}\}$ and the follow-up rule set is $\{number_1+number_2 \rightarrow number_3\}$. Then $x^2 \cdot x^3+6+1$ transforms to $x^5+6+1$ in a single user step as desired for "combine similar factors". However, $x^{2+2} \cdot x^3$ would transform only to $x^{2+2+3}$ because expression "2+2" is syntactically a sum rather than a number. So far there has not been a strong need to make the follow up go deeper for the SMG application. However, if the need arises, a flag may be set to force a deeper follow-up.

As was mentioned above, FIGS. 2a through 2o, and FIGS. 3a through 3o, illustrate screen displays typical for the calculator illustrated in FIG. 1 while running the application called symbolic math guide ("SMG"), which incorporates the DAG concept for interactive transformation of expressions and/or sub-expressions. The symbolic math guide provides step-by-step problem solving transformations for various mathematical problem types such as algebra and calculus to help students learn symbolic computation. In the embodiment shown, a statement of the type of problem to be solved such as simplifying a polynomial, computing a derivative, or as illustrated solving an equation, etc., is displayed at line 38 in display area 14 of FIG. 2a. Below the problem statement displayed at line 38 in area 14, there is also included a multi-line area 40 for displaying the actual problem being solved, such as the problem $x^2-3x=4$ as indicated by reference number 42 in FIGS. 2a and 3a. The problem to be solved is then followed by a display of step-by-step solutions using two different techniques as will be discussed hereinafter.

Figure 3A:
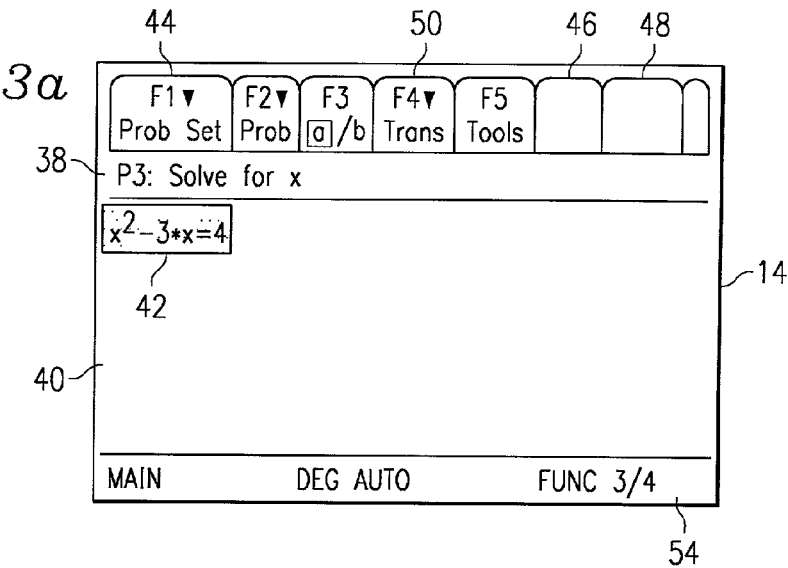
FIGS. 3a through 3o illustrate another example of screen displays of a TI-89 calculator while solving the same quadratic equation discussed with respect to 2a–2o according to a different set of steps using the features of the present invention.

As will be appreciated, a particular problem or mathematical sub-expression that constitutes a part of the problem will be selected for solving, expanding or simplifying, etc., such as for example, solving the equation $x^2-3x=4$ for x as indicated at 42 in FIGS. 2a and 3a of the multi-line display 40 shown in screen 14. As discussed earlier, screen 14 is also shown on calculator 10 in FIG. 1. Also as shown in FIGS. 2a and 3a, the programmable [F1], [F2], [F3], [F4] and [F5] keys of a calculator have been defined or designated for specific purposes as indicated at line 44 in multi-line display screen 14. These keys are located below the display screen area 14 on the TI-89 calculator illustrated in FIG. 1a. FIGS. 2a and 3a also show areas 46 and 48, which are available for two additional keys [F6] and [F7]. Although the TI-89 calculator only provides keys [F1] through [F5], the TI-92+ calculator actually has eight keys [F1] through [F8], which can be programmed or designated for specific purposes.

After the user presses [F4] key 50 trans, the calculator then evaluates the problem or mathematical expression to determine which mathematical transformations from those performable by the program are applicable to the selected problem. As was discussed above, this is accomplished by evaluating the problem with respect to the DAG as discussed above.

Figure 3B:
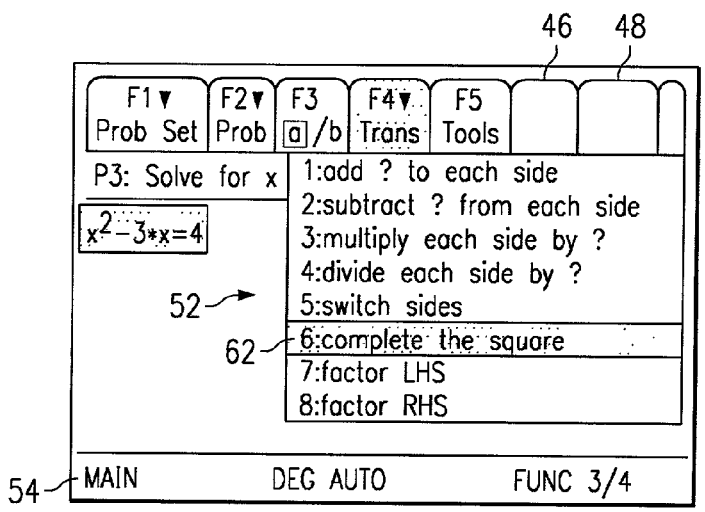

All of the possible transformations performable by the program are for explanation purposes only referred to herein as the master list and may or may not represent an actual list stored in memory. However, each of the available operations will be assigned a position in the hierarchy organization or DAG. Pointers to one or more of the applicable operations are then stored in the memory as a temporary list. In the process of solving for x in the problem indicated at 42 in FIGS. 2a and 3a, after pressing the [F4] trans key 50, a drop down menu will then be displayed as shown at 52 in FIGS. 2b and 3b, which represent the temporary list of applicable transformations such as switching sides or completing the square that can therefore transform the expression.

More specifically, the screen display 14 of FIGS. 2a and 3a shows the screen display after initializing SMG and entering a problem or choosing one from a problem set. The top area of the screen display 190 shows the menu bar 44. Below the menu bar is the problem identification and navigation bar 38, which allows the user to select a problem from a problem set. In the described embodiment, the first problem in the problem set is identified by the "P1" in the problem navigation bar 38. The current problem 42 is shown in the multi-line display or active screen area 40. A status line 54 is shown at the bottom of the screen. The status line changes to help the user. For example, the status line in FIGS. 2b and 3b indicate which function keys are available for selecting a menu item.

The problem navigation bar 38 also includes the problem type displayed next to the problem number, in this case, "solve for x." Control is moved to the navigation bar by moving the inverse video cursor over the navigation bar using the arrow keys 56 as shown in FIG. 1a. The navigation bar is then highlighted by inverse video and activated. When the navigation bar is activated and according to the present embodiment, the left and right arrow keys will display the previous and next problems in the problem set respectively.

The display shown in FIGS. 2a and 3a would be the initial screen display for solving the problem shown at line 42. In this case, "solve for x". Thus, the user is able to solve the problem with an interactive system by choosing available transformations. The control menu shown on line 44 of FIGS. 2a and 3a include "F4 Trans" to indicate that pressing the [F4] key 50 will activate the transformation menu. Pressing the F4 key 50 when the display shown in FIGS. 2a and 3*a* are in place results in the display shown in FIGS. 2*b* and 3*b*. The transformations listed in FIGS. 2*a* and 3*a* are those that are possible for the current state of the solution. Some of the possible transformations may not be optimal or lead to solving the problem. For example only, "add ? to each side" and "complete the square" are useful in FIGS. 2*b* and 3*b*. The possible transformations are selected by the SMG software for the current problem type and the current state of the solution.

To illustrate that a problem may be solved in several different ways, the sequence stamp for FIGS. 2*c*–2*o* differ from those of FIGS. 3*c*–3*o*, which will be discussed later. In the sequence shown in FIGS. 2*c*–2*o*, the user has selected transformation "1 add ? to each side" by pressing the [ENTER] key 58 when the first transformation is highlighted. The result of this selection is shown in FIG. 2*c*. A dialog box 60 in FIG. 2*c* allows the user to enter the amount to add to each side of the equation. In this case, "–4" is added to each side by typing the amount then pressing the [ENTER] key 58. The transformation to be performed is displayed as shown in FIG. 2*d*, and allows the user to imagine what will happen when the transformation is applied. At this point, pressing the [ENTER] key 58 as suggested by the prompt will apply the transformation. Applying the transformation results in the display shown in FIG. 2*e*.

Figure 2E:
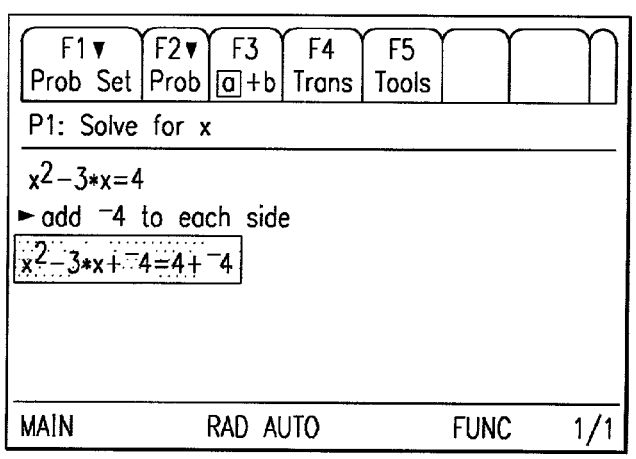
Figure 2O:
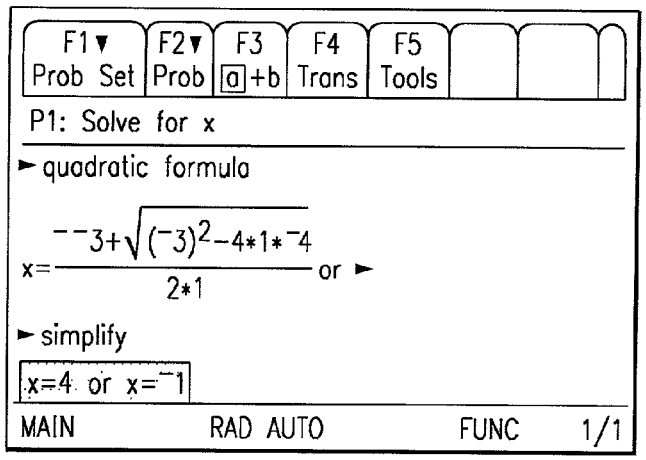

From the display shown in FIG. 2*e*, the user can press the [F4] key and select the transformation to perform the arithmetic, or the user can simply press [ENTER] to simplify the equation. Pressing [ENTER] from the display of FIG. 2*e* results in the display of FIG. 2*f*. Here the user is again given the opportunity to imagine the result of the operation, then pressing [ENTER] again will simplify the highlighted equation to that shown in FIG. 2*g*. The "add ? to each side" transformation is now complete.

The equation shown in FIG. 2*g* can be further transformed using the same steps used above. Pressing [F4] will display the transformations that are available for the current equation shown in FIG. 2*g*. FIG. 2*h* illustrates the transformations available, including the selected transformation of "factor left hand side." The results of the transformation are shown in FIG. 2*i*. (The additional steps of pausing to allow the user to imagine the operation have been left out of the figures at this point. In fact, when the TI-89 or TI-92+ calculators are used, the user can turn off this "Time to Think" mode.) The expression shown in FIG. 2*i* is further transformed by selecting the transformation "A·B=0→A=0 or B=0" as shown in FIG. 2*j*. The result of this transformation is shown in FIG. 2*k*. Again pressing [F4] shows the transformations available to the user for the current object. FIG. 2*l* illustrates the selection of "solve the linear equation." This final transformation gives the solution as shown in FIG. 2*m*.

As has been discussed, a feature of the present invention is that the system allows the user to explore the available transformations for a given problem type without the system giving the solution or prompting the user to a specific sequence of transformations. The user/student is given possible transformations, but some transformations may not lead to the solution. Further, there may be more than one sequence that does lead to the solution, as would be the case if the user were solving the problem with a pencil and paper. As illustrated in FIG. 2*h* a solution is possible even if a transformation other than "4i factor left hand side." For example, as shown in FIG. 2*h*, the user may also choose to apply the transformation "quadratic formula." Applying this transformation is shown in FIG. 2*n*. Again, pressing [EN-TER] will simplify the quadratic formula as shown in FIG. 2*o*. This gives the same solution as found above using a different sequence of transformations.

As mentioned above, a display list may include operations that would not simplify an expression or lead to a solution of an equation. This allows the student to make poor choices as well as good choices and to see the effect of such poor choices. At any point the student can back track by selecting an earlier expression or sub-expression in the history and choosing a different transformation, which automatically deletes all of the expressions below that point before applying the different transformation.

When the student makes a choice from the displayed menu (a good choice or a poor choice), the calculator will then operate on the selected problem or mathematical expression according to the student's choice. The results or the effect of the operation on the problem is then displayed in another line in display area 40. That is, the problem (expression) is displayed with the changes.

Figure 3O:
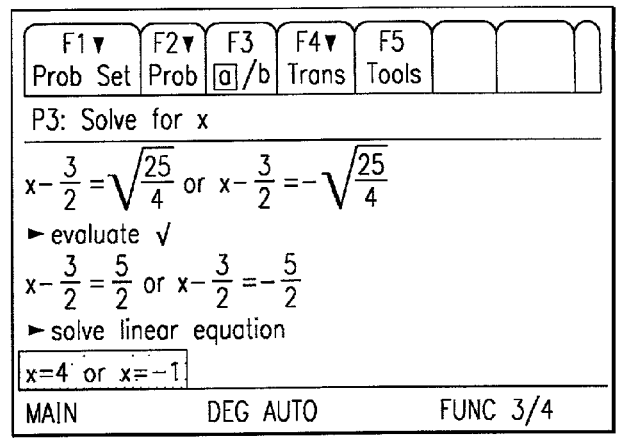

As has been discussed, there is often more than one way of solving a quadratic equation. Referring now to FIGS. 3*a* through 3*o*, there is illustrated still another set of screen displays resulting from a third approach to solve the same equation ($x^2-3x=4$) that was used and discussed with respect to the FIGS. 2*a* through 2*o*. Since the screen displays 3*a* through 3*o* show the second solution with step-by-step illustrations, it is believed that the Figures are self-explanatory and therefore will only be discussed briefly.

For example, in the embodiment illustrated in FIGS. 3*a* through 3*o* there is shown a third set of transformations for solving the quadratic equation 42. For example, when the transformation (e.g. complete the square) is selected from the drop down menu 52 as indicated at line 62 in FIG. 3*b*, the selection and the corresponding results are indicated at lines 64 and 66, respectively, as indicated in FIG. 3*c*.

Of course, if a poor selection is made, the selection and the results are still shown. In that case, however, the results will probably be even further from a solution, and the poor selection will have to be reversed. After the problem (or selected algebraic expression which makes up part of the problem) is displayed with the results of the previous operation, the calculator will then again determine which of the operations available from the master list are now applicable to the rewritten problem or mathematical expression, and a new temporary list of possible operations will be displayed. The new temporary list may include operations that were not applicable in the previous step and consequently were not displayed.

If the previous operation was with respect to a sub-expression that made up only part of the overall expression and has now been simplified as far as possible, the student may choose another and separate sub-expression that also makes up the expression, or the student may now chose an operation that operates on the whole problem. For example the [F3] sub-expression selection key was used to select the left side of the equation in FIG. 3*d*, as indicated by the dashed rectangle 68 in FIG. 3*d*. Although the individual steps are different, the procedure for solving equation 42 shown in FIGS. 3*a* through 3*o* is the same as was discussed above with respect to FIGS. 2*a* through 2*o*. Therefore, the remaining steps 3*e* through 3*o* will not be discussed further.

Referring now to FIGS. 4*a* through 4*t*, there is illustrated a directed acyclic graph (DAG) as used in the symbolic math guide (SMG). To aid in understanding of the DAG, various types of nodes are indicated by their shape. For example, oval-shaped nodes represent operations that are only allowed to be performed at the very top level of the selected expression or sub-expression. The elongated hexagon-shaped nodes represent rules or operations that can be selected, but also include one or more sub-levels of rules that can also be selected. The rectangular-shaped nodes represent a bottom level operation that can apply to the problem at any level, and rectangular-shaped nodes in dotted lines represent mid-level operations that are not menuable and are included to illustrate organizational aspects of the DAG. That is, the set of transformations indicated by the dashed line rectangle always have additional sub-level operations, but avoid difficulties such as an infinite loop by having no menu item.

FIGS. 4a and 4b represent the top levels of the DAG with respect to operations that can be performed on a standard polynomial, and FIGS. 4c through 4i are all branches extending from nodes found in FIGS. 2a and 2b. It should be noted, however, that none of the FIGS. 4a through 4i include any options (oval nodes) that are limited in application to the top level of the polynomial being simplified.

As shown, the top node 70 with menu string "standard form" is a set of rules that transforms polynomials to expanded form with standard textbook ordering of factors and terms. Branching directly from node 70 are three nodes, 72 "simplify", 74 "(A±B)/C→A/C±B/C", and 76 "expand". As can be seen, rules 72, 74 and 76 represent three different types of nodes in the DAG. Node 72 in FIG. 4a, for example, branches to node 78, which branches to node 80, which then branches to a bottom-level node 82, and another mid-level node 84. Bottom-level node 82 performs basic arithmetic and will not be discussed further. However, node 84 with menu string "apply 0 and 1 identities" branches to node 86 with menu string "applies 1 identities" and node 88 with menu string "apply 0 identities". However, it should be noted that node 86 itself branches into five different possible rules or operations as indicated on FIG. 4c. Similarly, node 88 branches into 11 rules as is also shown in FIG. 4c. Node 78 also branches to node 90 "simplify negation", which also branches into 10 separate rules shown in FIG. 4c.

Node 72 branches to two "non-menuable" nodes 92 RH_DistribChsAndSubtract and node 94 RH_OrderCollectFactorsTerms." Node 92 branches into nodes 96 and 98, and nodes 96 and 98 each branch into four additional rules as shown in FIG. 4d. In addition, node 72 also branches into eight other nodes, 100–114, most of which include one or more additional branches found in FIGS. 4e through 4i.

The node 74 branches from node 70, on the other hand, is itself a bottom-level node and does not have any descendants. Node 76 is a node that has a first set of rules to determine applicability. However, after applicability is determined, the second set of rules, which is usually more extensive than the applicability set of rules may be used for the transformations. As an example, node 76 (RH_Expand Rules) determines applicability for term expansion, however, node 110 (RH_Expand Rules+) is used for the actual transformation.

It should also be noted with respect to FIGS. 4a through 4i that, depending on the complexity of the problem, a menu may offer choices from a very high level node with many branches for a complex problem to only bottom level choices for a simple problem. That is, the highest-level node or choice offered may be at any level. It should also be noted that for problems having mid-level complexity, the starting point might also be at one of the "non-menuable" nodes, which are not necessarily branches of a higher-level node, such as for example, nodes 116 and 118.

FIGS. 4i through 4t illustrate still other rules or operations that make up the master list of SMG DAG and may be applied to various types of problems. Some of the rules, for example, deal with trigonometric or logarithmic expressions. The nature of the DAG for these figures is similar to FIGS. 4a through 4i, and therefore will not be discussed further.

Applicability Flow Chart

Referring now to FIG. 5 and considering the above discussions concerning the applicability algorithm and the SMG DAG, there is shown a flow diagram of the applicability algorithm. As shown, the first step 120 is to determine if the starting node is menuable. If the answer is "No," then the algorithm progresses to the next step 122, which determines if the node is a rule node. However, if the answer to step 120 is "Yes," the algorithm first increments the "depth" counter as indicated at step 124 before going to step 122. If the node is not a rule node, the algorithm progresses to step 126 discussed below. If the node is a rule node, the algorithm determines if the node is applicable (see step 128). If the answer to logic step 128 is "No," the node is inapplicable and the algorithm returns the information that the node is "inapplicable" and "covered" as indicated at step 130. If instead the rule node is applicable, the algorithm then determines if the node is "menuable" as indicated at step 132. If not menuable, the algorithm returns the information "applicable" and "not covered" as shown in step 134. If instead the applicable rule node is menuable, the menuable depth and node pointer is pushed onto the global stack (step 136) then the information "applicable" and "covered" is returned in step 138.

Again referring to step 122, if the node is not a rule node, the algorithm progresses to step 126, which sets three status indicators of the node as 1) "not yet encountered an applicable child"; 2) "not yet applicable"; and 3) "not yet any uncovered children". It should be noted that the code "language" used to set three status indicators of the node at step 126 is the same as used in Table 1 set out above. The algorithm then proceeds to step 140 to determine if there are any "unvisited" children of the node. If the answer is "Yes," the algorithm progresses to step 142 where the applicability function is recursively applied to the first unvisited child, storing the returned information in the local variables child_applicability and child_covered. The algorithm then proceeds to step 144 to test if the child was "applicable". If "No," the program loops back to step 140, discussed above. Otherwise the algorithm tests if an applicable child of node_pointer has been seen or if "not covered" is the value of the child_applicability variable as shown at step 146. If the determination is "No", then as shown, the question: "is seen an_applicable_child is assigned the value true and parent_applicability is assigned the value "applicable" in step 148, after which the algorithm proceeds to step 140 discussed above. Otherwise, parent_coverage is assigned the value "not covered" as indicated at step 150 before proceeding to step 148 discussed in the preceding sentence.

If step 140 determines that there were no unvisited children, the algorithm proceeds to step 151, which determines if parent_coverage has the value "not covered". If not, the algorithm returns the computed parent_applicability and parent_coverage in step 152. Otherwise the algorithm proceeds to step 154, which pushes the menuable depth and node_pointer onto a global stack, then assigns "covered" to parent_coverage, then proceeds to step 152 discussed above.

Pruning Flow Diagram

FIG. 6 illustrates a flow diagram of the "pruning" algorithm as is indicated at starting point 156. The stack computed by the applicability algorithm is realized as a partially filled array of structures, which facilitates operations done by the pruning algorithm. This array is passed by reference to the pruning algorithm. The first step 158 determines if the number of applicable menuable nodes stacked by the applicability algorithm exceeds the desired menu count. If the answer is "No," no pruning is necessary and the program returns as indicated at step 160. If instead the menu count is determined to be greater than that desired, the algorithm progresses to step 162 where the greatest depth stored in the used portion of the array is assigned to the local variable max_depth. Next, the algorithm moves to step 164 where a determination is made as to whether the max_depth is less than or equal to "1". If "Yes," then no further pruning is done and the program returns at step 166. Otherwise a variable "k" is set to the index of the last used element in the partially filled array as indicated at step 168 before advancing to step 170. Step 170 determines if "k" is less than the index of the first element. If the answer is "Yes," the algorithm loops back to step 162. This cannot happen unless step 176 has deleted all array entries having depth max_depth. There was at least one such entry, so the loop from step 170 to step 162 cannot continue indefinitely.)

If the answer for step 170 is "No," then a determination is made at step 172 to determine if the maximum depth is equal to depth of the $k^{th}$ element in the array. If the answer is "No," "k" is decremented as indicated at step 174 then the program loops back to step 170. However, if the determination is "Yes," then the $k^{th}$ element is deleted and the menu count is decremented as indicated at step 176. The algorithm then proceeds to step 178, which determine if the menu count is equal to the desired menu count. If the answer is "No," the algorithm goes to step 174 where "k" is decremented before looping back to step 170. If instead the menu count is equal to the desired menu count, no further pruning is required and the program returns at step 180.

Rule Bucket Flow Diagram

The DAG node selected from the [F4] trans menu could be used to access the corresponding rules during transformation of the selected expression or sub-expression. However, for large problems where efficiency is noticeable, it is more efficient to first make a data structure containing only the rule nodes descending from the selected node, then to sort that list into "buckets" according to the top-level operators or function names in those rule patterns, then to form an auxiliary index table of pairs with each pair being one of those top-level operators or functions together with a pointer into the sorted list. SMG does this, but it is important to note that it is optional.

Figure 7:
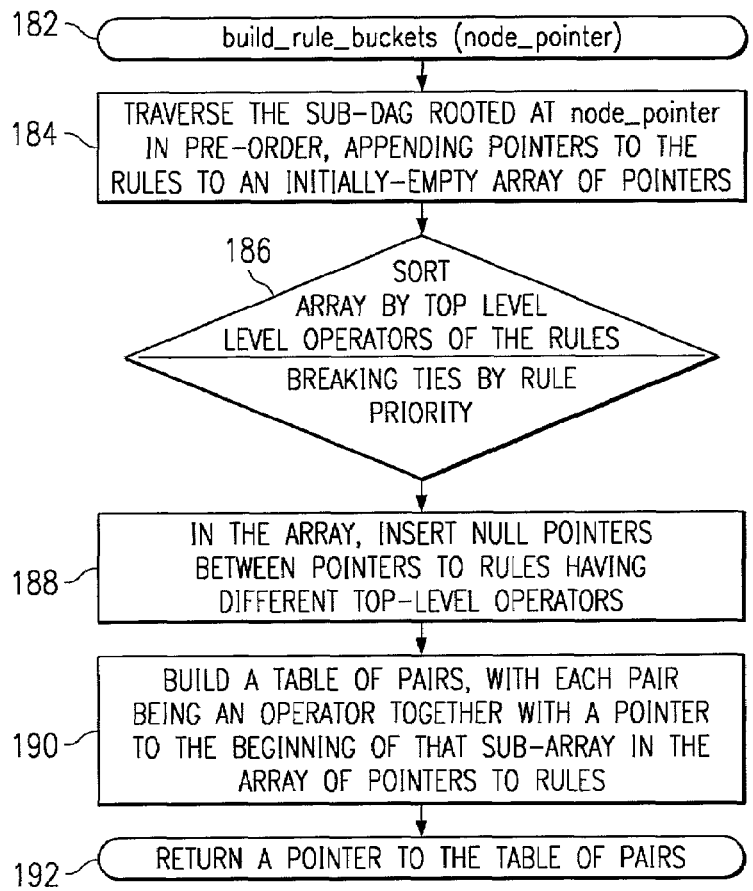
FIG. 7 is a flow diagram of the algorithm for dynamically organizing the selected rules into indexed buckets to make the transformation algorithm faster.

FIG. 7 shows a flow chart for this algorithm that builds the rule buckets, starting at the function entry step 182. The parameter named node_pointer is the DAG node associated with the [F4] trans menu item selected by the user. The program then advances to step 184 where the sub-DAG rooted at this node is traversed depth first to push successively-visited rule nodes onto a stack stored in a partially-filled array. The algorithm then proceeds to step 186, where this partially filled array is sorted according to the top-level operator or function of the left side of the rule patterns, with ties broken according to the priorities stored with the rule nodes. Null pointers are then also added between pointers to rules having different top-level operators or function names in the rule patterns, as indicated at step 188, so that the end of each bucket can easily be determined during transformation of the expression. An index table of pairs of operators or function names and a pointer representing the beginning of the sub-array of rules in the array of pointers is then generated as indicated at step 190. A pointer to this index table is then returned as shown in step 192.

Flow Chart for Transforming the Expression or Sub-expression

Figure 8A:
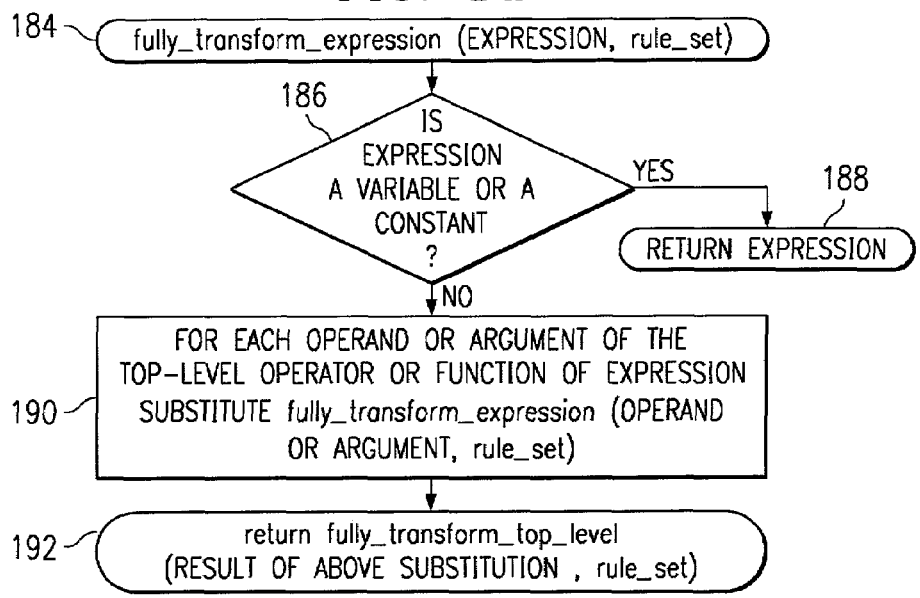
FIGS. 8a through 8c are flow diagrams of the algorithm for transforming expressions or sub-expression.
Figure 8B:
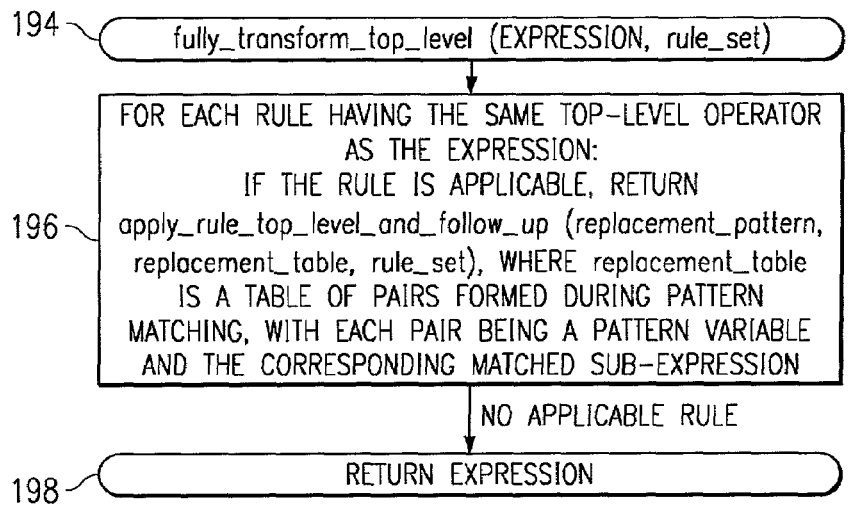
Figure 8C:
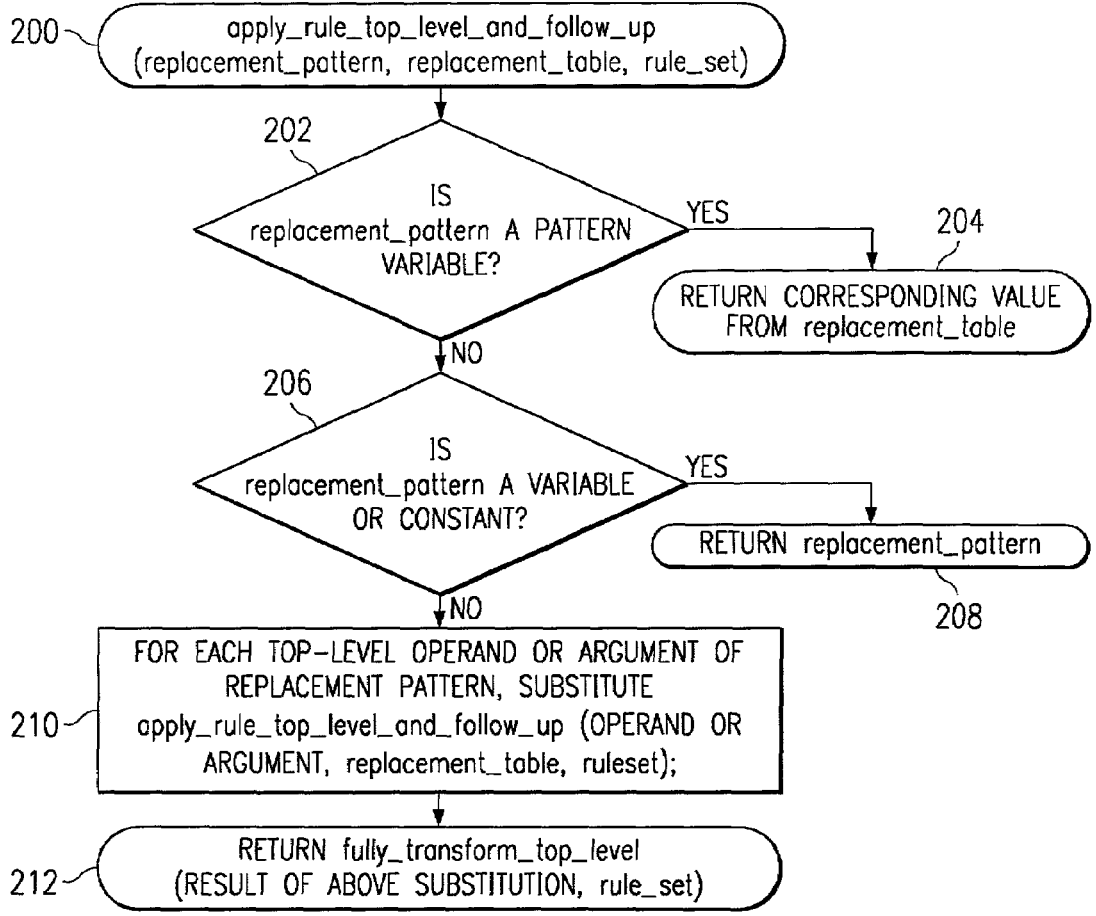

FIGS. 8a, 8b and 8c show flow diagrams for the algorithm used to transform the selected expression or sub-expression according to the selected [F4] trans menu item.

This algorithm begins in by invoking the function fully_transform_expression (expression, rule_set), as indicated at 184 on the flow chart of FIG. 8a: Step 186 determines if the expression is a variable or constant. If the determination is "Yes," the expression is simply returned as shown at step 188. If instead the answer is "No," the function fully_transform_expression (operand or argument, rule_set) is recursively applied to each operand or argument as shown in step 190 and then the function fully_transform_top_level is applied to the result of step 190 as shown in step 192.

In FIG. 8b, function fully_transform_top_level (expression, rule_set) as shown at 194 loops though each rule in rule_set that has the same top-level operator as expression; and for the first rule that is applicable, if any, the result of function apply_rule_top_level_and_follow_up
(replacement_pattern, replacement_table, rule_set), is returned as shown in step 196, where replacement_table is generated as a side effect of the applicability determination. If instead no rule is applicable, then the expression is returned untransformed as shown in step 198.

In FIG. 8c, function apply_rule_top_level_and_follow_up (reference number 200) first determines in step 202 if the replacement pattern is a pattern variable. If so, the corresponding value from the replacement table is returned as shown in step 204. Otherwise, step 206 determines if the replacement pattern is a variable or a constant. If so, the replacement pattern is returned in step 208. Otherwise, step 210 substitutes for each operand or argument of the replacement pattern the value determined by recursively invoking apply_rule_top_level_and_follow_up on that operand or argument. Then step 212 returns the result of recursively invoking function fully_transform_top_level on the result of step 210.

User Interaction Algorithm

Figure 9:
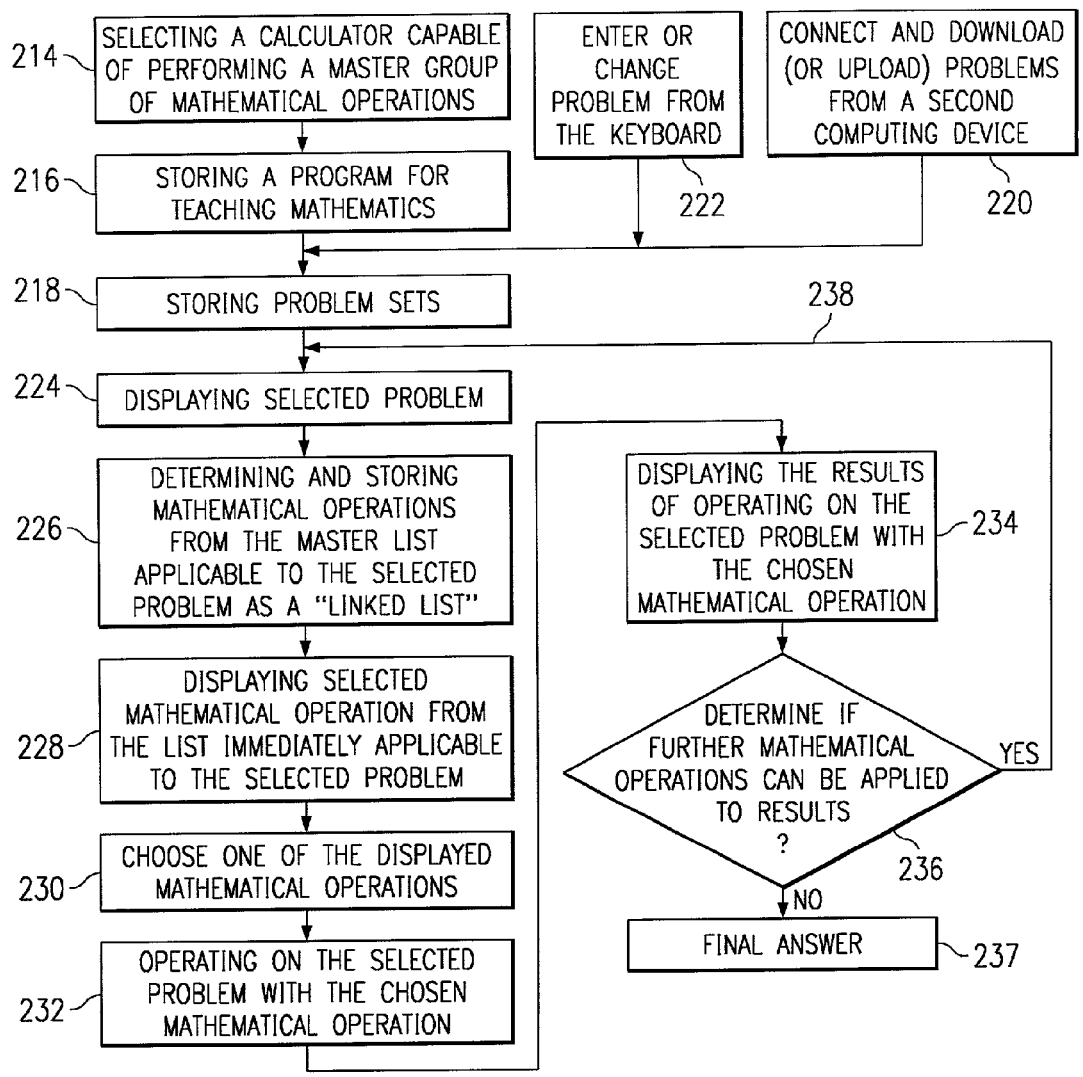
FIG. 9 is a flow diagram showing the how user's interact with the SMG program that incorporates the features of this invention.

Referring now to FIG. 9, there is shown a flow diagram illustrating the algorithm for interacting with an SMG user. As shown at step 214, a calculator such as a "TI-89" or "TI-92 Plus" graphing calculator has the capability of performing a variety of mathematical operations, including basic arithmetic, trigonometry, algebra and transformations such as simplification and expansions. The calculator may also be capable of more advanced operations such as differentiation and integration and will be capable of storing a program (software or firmware) for teaching mathematics according to the teachings of the invention as indicated at step 216. An area of memory then receives and stores at least one mathematical problem as shown at step 218. The problem may be downloaded or uploaded from or to another computer connected to an input/output port as shown at 220 or entered by a keyboard as shown at step 222. Once a problem is chosen, the selected problem is displayed on the screen 14 (see FIG. 1) as indicated at step 224. After the user presses [F4] trans, the applicable transformations available in the sub-DAG associated with the particular problem type are then determined and stored in memory as a temporary list. This step is indicated by reference number 226. One or more of the operations stored in this temporary list are then displayed on the calculator display as a drop down menu (preferably, but not necessarily) as indicated at step 228 and discussed above. Then as shown at step 230, the user or operator chooses one of the displayed transformations to be applied or used to operate on the selected problem or mathematical sub-expression. The calculator then operates on the problem with the chosen operation as shown at step 232 and displays the result or effect of the operation on the problem indicated at step 234. It is again noted that the choices displayed at step 228, may include choices which will operate on or transform the problem, but will not move the problem toward a solution. This allows the student to observe and evaluate the effect of an incorrect or poor choice.

Then as shown at step 236, the user can determine if further operations available in the master group will lead to further solution of the problem.

If the determination is "NO", the results displayed at step 234 will be the final solution as indicated at 237. However, if the determination is "YES", the results displayed at 234 will now be considered to be the problem to be solved, and the steps 224 through 236 will be repeated as indicated by loop arrow 238. This process can, of course, be repeated as often as necessary until a final solution is determined.

Although the present invention has been described in detail, it should be understood that various changes, substitutions and alterations could be made to the subject matter of this invention without departing from the spirit and scope as defined by the dependent claims.

We claim:

1. In an electronic calculator comprising a processor, a display screen and a keyboard, a method of operating the processor to select and organize rules to allow a user to change a selected expression displayed on the display screen from a first state to a preferred state, comprising the steps of:
    in response to a user input, determining a multiplicity of rules which are applicable to the selected expression;
    arranging said multiplicity of rules according to a hierarchy of rules;
    associating said multiplicity of rules with a plurality of nodes, and associating selected ones of said plurality of nodes with another plurality of nodes, such that said plurality of nodes and said another plurality of nodes are indicative of levels of said hierarchy of rules;
    defining unique identifiers for each of said plurality of nodes and said another plurality of nodes, said unique identifiers corresponding to individual rules and sets of related rules of said multiplicity of rules for changing said selected expression from said first state to said preferred state; and
    displaying on the display screen indicators for said unique identifiers that may be selected by the user to cause the rules to be applied to said selected expression to change it to said preferred state.

2. The method of claim 1 wherein said step of associating further comprises the step of precluding inclusion of rules in a set of rules that could result in infinite looping or infinite recursion.

3. The method of claim 2 wherein said unique identifiers for a plurality of nodes are selected so as to avoid designating contradictory rules that could result in infinite looping or infinite recursion.

4. The method of claim 3 wherein said method of organizing is implemented on a computer device selected from the group comprising a hand-held calculator and a hand-held computing device.

5. The method of claim 1 wherein said steps of arranging, associating and defining further comprises avoiding duplication of rules, sets of rules and node identifiers that are members of more than one set of rules.

6. The method of claim 5 wherein said steps of arranging, associating, defining and avoiding comprises the step of organizing said rules in a directed acyclic format or graph (DAG) data structure.

7. The method of claim 6 wherein said subject matter is selected from one of the group comprising mathematics, education, algebra, calculus and differential equations.

8. The method of claim 6 wherein said method of organizing is implemented on a computer device selected from the group comprising a hand-held calculator and a hand-held computing device.

9. The method of claim 5 wherein said method of organizing is implemented on a computer device selected from the group comprising a hand-held calculator and a hand-held computing device.

10. The method of claim 1 wherein said subject matter is selected from one of the group comprising mathematics, education, algebra, calculus and differential equations.

11. The method of claim 1 wherein said method of organizing is implemented on a computer device selected from the group comprising a hand-held calculator and a hand-held computing device.

12. In an electronic calculator comprising a processor, a display screen and a keyboard, a method of operating the processor to select and organize rules to allow a user to change a selected expression displayed on the display screen from a first state to a preferred state comprising the steps of:
    in response to a user input, determining a multiplicity of rules which are applicable to the selected expression;
    arranging said multiplicity of rules according to a hierarchy of rules;
    determining which of the rules of said hierarchy are members of one or more sets with certain of these sets being members of other sets; and
    indicating on the display screen which of these rules and sets can be selected.

13. The method of claim 12 wherein said steps of arranging and indicating which rules can be selected precludes the selection of a set of rules that could result in infinite looping or infinite recursion.

14. In an electronic calculator comprising a processor, a display screen and a keyboard, a method for operating the processor to select and organize rules to allow a user to change the state of a selected expression displayed on the display screen from a first state to a preferred state comprising the steps of:
    in response to a user input, determining a multiplicity of rules for changing said subject matter from one state to another;
    organizing said multiplicity of rules comprising the steps of:
        arranging said multiplicity of rules according to a hierarchy or rules,
        associating said multiplicity of rules with a plurality of nodes, and associating selected ones of said plurality of nodes with another plurality of nodes, such that said plurality of nodes and said another plurality of nodes are indicative of levels of said hierarchy of rules, and defining unique identifiers for each of said nodes of said plurality of nodes and said another plurality of nodes, said unique identifiers corresponding to individual rules or sets of related rules of said multiplicity of rules for changing said subject matter from said first state to said preferred state;

displaying on said display screen indicators for said unique identifiers that may be selected by the user;

in response to the user selecting a displayed indicator, selecting a node from one of said plurality of nodes and said another plurality of nodes associated with said selected indicator, for selectively changing said selected expression from said first state to said preferred state;

applying one of said rules associated with said selected node to change said subject matter from said one state to said preferred state.

15. The method of claim 14 wherein said unique identifiers for said plurality of nodes are selected so as to avoid designating contradictory rules that could result in infinite looping or infinite recursion.

16. The method of claim 14 wherein said steps of arranging, associating and defining further comprises avoiding duplication of rules, sets of rules and node identifiers that are members of more than one set of rules.

17. The method of claim 16 further comprising determining a group of nodes applicable to said subject matter and generating an array or linked list of said nodes applicable to said subject matter covering all rules directly or indirectly associated with a selected node, said array including the maximum number of rules associated with a single node while avoiding inclusion of rules that would result in infinite looping or infinite recursion.

18. The method of claim 17 further comprising the steps of:

selecting a top level node of said another plurality of nodes as a starting node;

determining the depth of each node of said plurality of nodes and said another plurality of nodes from said starting node to the lowest level nodes; and pruning rules from a node having the lowest depth level.

19. The method of claim 14 wherein said steps of arranging, associating, defining and avoiding comprises the step of organizing said rules in a directed acyclic format or graph (DAG) data structure.

20. The method of claim 19 further comprising determining a group of nodes applicable to said subject matter and generating an array or linked list of said nodes applicable to said subject matter covering all rules directly or indirectly associated with a selected node, said array including the maximum number of rules associated with a single node while avoiding inclusion of rules that would result in infinite looping or infinite recursion.

21. The method of claim 20 further comprising the steps of:

selecting a top level node of said another plurality of nodes as a starting node;

determining the depth of each node of said plurality of nodes and said another plurality of nodes from said starting node to the lowest level nodes; and pruning rules from a node having the lowest depth level.

22. The method of claim 14 further comprising the step of generating an array or linked list of pointers to ones of said plurality of nodes and said another plurality of nodes applicable to a particular problem state.

23. The method of claim 22 further comprising generating a pointer to at least one of said pointers of said array of pointers.

24. The method of claim 22 wherein said method for changing the state of selected subject matter is implemented on a computing device selected from the group comprising a hand-held calculator and a hand-held computing device.

25. The method of claim 14 further comprising determining a group of nodes applicable to said subject matter and generating an array or linked list of said nodes applicable to said subject matter covering all rules directly or indirectly associated with a selected node, said array including the maximum number of rules associated with a single node while avoiding inclusion of rules that would result in infinite looping or infinite recursion.

26. The method of claim 25 further comprising the steps of:

selecting a top level node of said another plurality of nodes as a starting node;

determining the depth of each node of said plurality of nodes and said another plurality of nodes from said starting node to the lowest level nodes; and pruning rules from a node having the lowest depth level.

27. The method of claim 26 further comprising the steps of:

generating a group or bucket of nodes from said array or linked list of nodes having a node with the highest common depth level to increase the speed of changing complex introduced subject matter.

28. The method of claim 26 wherein said method for changing the state of selected subject matter is implemented on a computing device selected from the group comprising a hand-held calculator and a hand-held computing device.

29. The method of claim 25 further comprising the step of:

generating a group or bucket of nodes from said array or linked list of nodes having a node with the highest common depth level to increase the speed of changing complex introduced subject matter.

30. The method of claim 29 further comprising repeating said applying step with other rules associated with said selected node until said selected expression has been changed to said preferred state.

31. The method of claim 30 further comprising the steps of:

avoiding revisiting fully changed portions of said selected expression; and following said selecting step by applying a different set of rules.

32. The method of claim 29 wherein said method for changing the state of selected subject matter is implemented on a computing device selected from the group comprising a hand-held calculator and a hand-held computing device.

33. The method of claim 25 wherein said method for changing the state of selected subject matter is implemented on a computing device selected from the group comprising a hand-held calculator and a hand-held computing device.

34. The method of claim 14 and further comprising repeating said applying step with other rules associated with said selected node until said selected expression has been changed to said preferred state.

35. The method of claim 14 wherein said method for changing the state of selected expression is implemented on a computing device selected from the group comprising a hand-held calculator and a hand-held computing device.

36. The method of claim 14 wherein said method for changing the state of selected subject matter is implemented on a computing device selected from the group comprising a hand-held calculator and a hand-held computing device.

37. The method of claim 14 wherein rules associated with said selected node are not limited to rules that always lead to achieving said preferred state.

38. A method of operating a hand-held computing device having a display, a processor, a keyboard and memory for teaching procedures for solving mathematical problems comprising the steps of:

provided a master group of mathematical operations performable by said processor;

organizing said master group of mathematical operations, said organizing comprising the steps of:

arranging said master group of mathematical operations according to a hierarchy of rules, associating said master group of operations with a plurality of nodes, and associating selected ones of said plurality of nodes with another plurality of nodes, such that said plurality of nodes and said another plurality of nodes are indicative of levels of said hierarchy of said master group of mathematical operations, and defining unique identifiers for each of said plurality of nodes and said another plurality of nodes, said unique identifiers corresponding to individual mathematical operations or sets of related mathematical operations of said master group of mathematical operations for solving mathematical problems;

storing a mathematical problem in memory;

displaying said mathematical problem on said display of said hand-held computing device;

determining a node from one of said another plurality of nodes associated with mathematical operations for solving said mathematical problem;

displaying selected ones of said unique identifiers representative of mathematical operations under said node, said mathematical operations being immediately operable on said selected mathematical problem and not limited to mathematical operations which always lead to a solution of said mathematical problem; and in response to a user selecting one of said displayed unique identifiers:

applying a mathematical operation represented by said selected unique identifier to said mathematical problem; and displaying the results of applying said mathematical operation to said mathematical problem.

39. The method of claim 38 and comprising the further steps of selecting the displayed results as the mathematical problem to be solved and then repeating the steps of "displaying said mathematical problem" through the steps of "displaying the results" until said stored mathematical problem has been solved.

40. The method of claim 39 further comprising the steps of:

avoiding revisiting fully changed portions of said stored mathematical problem; and following said selecting step by applying a different set of mathematical operations.

41. The method of claim 38 wherein said unique identifiers for said plurality of nodes are selected so as to avoid designating contradicting mathematical operations that could result in infinite looping or infinite recursion.

42. The method of claim 38 wherein said steps of arranging, associating and defining further comprising avoiding duplication of mathematical operations, sets of mathematical operations, and node identifiers that are members of more than one group of mathematical operations.

43. The method of claim 38 wherein said hand-held computing device includes an input/output port and further comprises the steps of providing a connection between said hand-held computing device and another computing device and then exchanging data there between.

44. The method of claim 38 wherein step of organizing comprises the step of organizing said rules in a directed acyclic format or graph (DAG).

45. The method of claim 38 further comprising the step of generating an array or linked list of pointers to said plurality of nodes and said another plurality of nodes having said unique identifiers.

46. The method of claim 38 further comprising the step of generating a pointer to at least one of said pointers of said array of pointers.

47. The method of claim 38 further comprising, determining a group of nodes applicable to said mathematical problem and generating an array or linked list of said nodes applicable to said mathematical problem covering all mathematical operations directly or indirectly associated with a selected node, said array including the maximum number of mathematical operations associated with a single node while avoiding inclusion of mathematical operations that would result in infinite looping or infinite recursion.

48. The method of claim 38 further comprising the steps of:

selecting a top level node of said another plurality of nodes as a starting node;

determining the depth of each node of said plurality of nodes and said another plurality of nodes from said starting node to the lowest level nodes;

providing an indication of the depth of nodes included in said generated array; and pruning rules from a node having the lowest depth level.

49. The method of claim 48 further comprising the step of:

generating a group or bucket of nodes from said array or linked list of nodes having a node with the highest common depth level to increase the speed of changing complex introduced subject matter.

* * * * *